United States Patent
Akhavain Mohammadi et al.

(10) Patent No.: US 10,397,190 B2
(45) Date of Patent: Aug. 27, 2019

(54) SYSTEM AND METHOD FOR GENERATING AN OBFUSCATED OPTICAL SIGNAL

(71) Applicants: Mehdi Arashmid Akhavain Mohammadi, Ottawa (CA); Hamid Mehrvar, Ottawa (CA); Mohammad Mehdi Mansouri Rad, Kanata (CA)

(72) Inventors: Mehdi Arashmid Akhavain Mohammadi, Ottawa (CA); Hamid Mehrvar, Ottawa (CA); Mohammad Mehdi Mansouri Rad, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 192 days.

(21) Appl. No.: 15/017,132

(22) Filed: Feb. 5, 2016

(65) Prior Publication Data

US 2017/0230337 A1    Aug. 10, 2017

(51) Int. Cl.
*H04L 29/06* (2006.01)
*H04B 10/50* (2013.01)
(Continued)

(52) U.S. Cl.
CPC .......... *H04L 63/04* (2013.01); *H04B 10/50* (2013.01); *H04B 10/516* (2013.01); *H04B 10/60* (2013.01);
(Continued)

(58) Field of Classification Search
CPC ..... H04B 10/50; H04B 10/60; H04L 63/0428; H04L 63/08; H04L 63/04; H04L 9/00; H04J 14/00
(Continued)

(56) References Cited

U.S. PATENT DOCUMENTS

| | | | | |
|---|---|---|---|---|
| 4,900,917 A | * | 2/1990 | Dixon | H04B 10/27 250/225 |
| 5,031,236 A | * | 7/1991 | Hodgkinson | G02F 1/011 359/900 |

(Continued)

FOREIGN PATENT DOCUMENTS

| | | | |
|---|---|---|---|
| CN | 102368704 A | * | 3/2012 |
| CN | 102368704 A | | 3/2012 |

(Continued)

OTHER PUBLICATIONS

Khan, Saeed et al., "Electronically tunable silicon photonic delay lines", Optics Express, Jun. 2, 2011, pp. 11780-11785, vol. 19, No. 12, USA.
Wang, Z., et al., "Improving the privacy of optical steganography with temporal phase masks", Optics Express, Mar. 15, 2010, pp. 6079-6088, vol. 18, No. 6, USA.
(Continued)

*Primary Examiner* — Shahriar Zarrineh

(57) ABSTRACT

A system and method for obfuscating an optical signal is disclosed. Obfuscating the optical signal may make it more difficult for the optical signal to be detected by an interloper. In one embodiment, an optical signal is received at an optical transmitter, and an obfuscated optical signal is generated by performing a modification of the received optical signal. The obfuscated optical signal is then transmitted from the optical transmitter to an optical receiver. An at least partially deobfuscated optical signal is generated at the optical receiver by performing a modification of the obfuscated optical signal. The modification performed at the optical receiver corresponds to the modification performed at the optical transmitter.

28 Claims, 11 Drawing Sheets

(51) Int. Cl.
- *H04B 10/60* (2013.01)
- *H04J 14/00* (2006.01)
- *H04B 10/516* (2013.01)
- *H04B 10/67* (2013.01)
- *H04B 10/85* (2013.01)
- *H04J 14/02* (2006.01)

(52) U.S. Cl.
CPC ............ *H04B 10/67* (2013.01); *H04B 10/85* (2013.01); *H04J 14/00* (2013.01); *H04J 14/02* (2013.01)

(58) Field of Classification Search
USPC ........................................................ 713/150
See application file for complete search history.

(56) References Cited

U.S. PATENT DOCUMENTS

| | | | | |
|---|---|---|---|---|
| 5,216,657 | A * | 6/1993 | Nishiuchi | G11B 7/00557 369/59.12 |
| 5,353,114 | A * | 10/1994 | Hansen | G02F 1/225 356/477 |
| 5,373,367 | A * | 12/1994 | DeGunther | G01N 21/538 356/337 |
| 5,896,211 | A * | 4/1999 | Watanabe | H04B 10/50 398/187 |
| 6,075,647 | A * | 6/2000 | Braun | G01J 3/26 356/416 |
| 6,104,477 | A * | 8/2000 | Yoshida | H04B 10/532 356/73 |
| 6,178,021 | B1 * | 1/2001 | Bruyere | G02B 6/278 385/11 |
| 6,339,489 | B1 * | 1/2002 | Bruyere | H04B 10/2572 398/147 |
| 6,723,978 | B1 * | 4/2004 | Baldwin, Jr. | H04B 10/07 250/227.11 |
| 6,782,211 | B1 * | 8/2004 | Core | H04B 10/60 398/204 |
| 7,447,443 | B2 * | 11/2008 | Bai | H04B 10/5051 359/237 |
| 7,599,627 | B2 * | 10/2009 | Schemmann | H04B 10/2513 359/326 |
| 9,252,908 | B1 * | 2/2016 | Branlund | H04J 14/00 |
| 9,473,263 | B2 * | 10/2016 | Jiang | H04B 10/0775 |
| 9,531,480 | B2 * | 12/2016 | Xie | H04B 10/616 |
| 9,755,751 | B2 * | 9/2017 | Huh | H04B 10/40 |
| 2002/0003916 | A1 * | 1/2002 | Penninckx | G01M 11/336 385/11 |
| 2002/0089718 | A1 * | 7/2002 | Penninckx | H04B 10/2513 398/65 |
| 2002/0181056 | A1 * | 12/2002 | Schemmann | H04B 10/1121 398/156 |
| 2003/0013304 | A1 * | 1/2003 | Deliwala | B82Y 20/00 438/689 |
| 2003/0035605 | A1 * | 2/2003 | Bouevitch | G02B 6/2766 385/1 |
| 2003/0058504 | A1 * | 3/2003 | Cho | H04B 10/2543 398/147 |
| 2003/0063834 | A1 * | 4/2003 | Godbout | G02B 6/105 385/11 |
| 2003/0072060 | A1 * | 4/2003 | Sourani | H04B 10/60 398/121 |
| 2003/0161637 | A1 * | 8/2003 | Yamamoto | H04B 10/2503 398/167.5 |
| 2003/0190118 | A1 * | 10/2003 | Edvold | G02B 6/29376 385/24 |
| 2004/0109696 | A1 * | 6/2004 | Toshihisa | H04B 10/503 398/198 |
| 2005/0078913 | A1 * | 4/2005 | Blauvelt | G02B 6/12007 385/39 |
| 2006/0153575 | A1 * | 7/2006 | Bulow | H04B 10/2572 398/155 |
| 2006/0273924 | A1 | 12/2006 | Schwartz | |
| 2006/0280304 | A1 | 12/2006 | Waters | |
| 2007/0201877 | A1 * | 8/2007 | Epps | H04J 14/0227 398/154 |
| 2007/0223934 | A1 | 9/2007 | Osterberg et al. | |
| 2008/0107425 | A1 * | 5/2008 | Rasmussen | H04B 10/2569 398/152 |
| 2009/0034966 | A1 * | 2/2009 | Tanimoto | H04B 10/0795 398/25 |
| 2009/0074428 | A1 * | 3/2009 | Liu | H04B 10/2513 398/208 |
| 2009/0128814 | A1 * | 5/2009 | Szafraniec | G01J 4/04 356/364 |
| 2009/0190930 | A1 * | 7/2009 | Von Der Weid | H04B 10/2569 398/81 |
| 2009/0208225 | A1 * | 8/2009 | Daghighian | G02F 1/0136 398/184 |
| 2009/0231681 | A1 * | 9/2009 | Du | G02B 6/272 359/334 |
| 2010/0302637 | A1 * | 12/2010 | Little | G02B 6/2793 359/489.08 |
| 2011/0044461 | A1 * | 2/2011 | Kuech | H04M 9/082 381/66 |
| 2011/0052196 | A1 * | 3/2011 | Gnauck | H04B 10/50 398/79 |
| 2011/0142449 | A1 * | 6/2011 | Xie | H04B 10/60 398/65 |
| 2012/0070159 | A1 * | 3/2012 | Ishihara | H04B 10/07951 398/202 |
| 2012/0096061 | A1 * | 4/2012 | Hauske | H04B 10/2507 708/319 |
| 2012/0134667 | A1 * | 5/2012 | Westlund | H04B 10/60 398/25 |
| 2012/0151606 | A1 * | 6/2012 | Hannon | G06F 21/83 726/29 |
| 2012/0224850 | A1 * | 9/2012 | Cavaliere | H04J 14/00 398/34 |
| 2012/0237206 | A1 * | 9/2012 | Izumi | H04B 10/2572 398/25 |
| 2013/0039646 | A1 * | 2/2013 | Bruno | H04B 10/85 398/16 |
| 2013/0051801 | A1 * | 2/2013 | Kuschnerov | H04B 10/2572 398/65 |
| 2013/0058652 | A1 * | 3/2013 | Charbonnier | H04B 10/2587 398/58 |
| 2013/0108276 | A1 * | 5/2013 | Kikuchi | H04B 10/677 398/158 |
| 2013/0202021 | A1 * | 8/2013 | Zhang | H04B 10/614 375/232 |
| 2013/0209096 | A1 * | 8/2013 | Le Pallec | H04J 3/0667 398/35 |
| 2013/0272700 | A1 * | 10/2013 | Satoh | H04B 10/50 398/45 |
| 2014/0016949 | A1 * | 1/2014 | Koizumi | H04B 10/69 398/212 |
| 2014/0050235 | A1 * | 2/2014 | Clowes | G02F 1/365 372/6 |
| 2014/0064732 | A1 * | 3/2014 | Kai | H04B 10/6161 398/76 |
| 2014/0126916 | A1 * | 5/2014 | Ota | H04B 10/2569 398/152 |
| 2014/0267919 | A1 * | 9/2014 | Heller | G11B 27/031 348/607 |
| 2015/0071439 | A1 | 3/2015 | Liu et al. | |
| 2015/0104191 | A1 * | 4/2015 | Hajimiri | H04B 10/50 398/183 |
| 2015/0128223 | A1 * | 5/2015 | Magri | H04L 45/42 726/4 |
| 2015/0188637 | A1 * | 7/2015 | Tanimura | H04B 10/532 398/184 |
| 2015/0280834 | A1 * | 10/2015 | Sun | H04B 10/6164 398/79 |
| 2015/0358078 | A1 * | 12/2015 | Ogasahara | H04J 14/06 398/25 |
| 2016/0119056 | A1 * | 4/2016 | Costantini | H04B 10/85 726/4 |

(56) References Cited

U.S. PATENT DOCUMENTS

| | | | |
|---|---|---|---|
| 2016/0149638 A1* | 5/2016 | Bruno | H04B 10/079 398/25 |
| 2016/0241574 A1* | 8/2016 | Kumar | H04L 63/12 |
| 2016/0255054 A1* | 9/2016 | Wan | H04L 63/0414 713/160 |
| 2016/0261351 A1* | 9/2016 | Raybon | G02B 6/2861 |
| 2017/0111108 A1* | 4/2017 | Abe | H04B 10/03 |
| 2017/0195981 A1* | 7/2017 | Shor | H04W 56/009 |
| 2017/0250776 A1* | 8/2017 | Morsy-Osman | H04B 10/532 |
| 2018/0131449 A1* | 5/2018 | Kare | G01S 17/026 |

FOREIGN PATENT DOCUMENTS

| | | | | |
|---|---|---|---|---|
| CN | 102684786 A | | 9/2012 | |
| CN | 104980228 A | * | 10/2015 | |
| CN | 104980228 A | | 10/2015 | |
| CN | 106169951 A | * | 11/2016 | H04B 10/85 |
| GB | 201600590 | * | 2/2016 | G02F 1/0121 |
| WO | 2006130362 A3 | | 10/2008 | |

OTHER PUBLICATIONS

Prucnal, Paul R., et al., "Physical layer security in fiber-optic networks using optical signal processing", SPIE, Optical Transmission Systems, Switching, and Subsystems VII, 2009, pp. 1-10, vol. 7632, USA.

Fok, Mable P., "Securing Data Networks Using Optical Signal Processing", Photonics in Switching, 2008. PS 2008. International Conference, Aug. 4-7, 2008, pp. 1-2, IEEE, Sapporo, Japan.

Wu, Bernard B., et al., "A method for secure communications over a public fiber-optical network", Optics Express, May 1, 2006, pp. 3738-3751, vol. 14, No. 9, Optical Society of America, USA.

Takahashi, Hiroshi, "Silica waveguide device enables high-speed optical communication", SPIE Newsroom, May 10, 2011, pp. 1-3, NTT Photonics Laboratories, Atsugi, Japan.

Murata, Koichi, et al., "Optical Device Technologies for Future Network Evolution", NTT Technical Review, Mar. 2011, pp. 1-6, vol. 9 No. 3, NTT Photonics Laboratories, Atsugi-shi, Japan.

Author Unknown, "LambdaDriver®—LambdaDriver—Dispersion Compensation Modules (DCM)", Data Sheet, 2011, pp. 1-2, MRV Communications.

* cited by examiner

SYSTEM AND METHOD FOR GENERATING AN OBFUSCATED OPTICAL SIGNAL

FIELD

The following relates to modifying an optical signal in order to generate an obfuscated optical signal.

BACKGROUND

In an optical communication system, an optical signal is sent from a transmitter to a receiver over an optical channel. At the transmitter, data is received in the electrical domain and the optical signal is generated in accordance with the received data. At the receiver, the data is recovered from the received optical signal.

The data may be encrypted in the electrical domain, prior to being converted into an optical signal. However, an interloper may intercept the optical signal during transmission and convert the optical signal back into data in the electrical domain. The interloper may then try to decrypt the data.

Encryption is performed in the electrical domain, and both encryption and decryption of data carry a computational cost. Service providers wishing to provide a secure channel must either ensure that their customers are using encryption, or they must do bulk encryption and decryption at either end of a channel. Service provider customers may not be sufficiently sophisticated to ensure all communications are encrypted, and the cost of doing bulk encryption is not attractive to many service providers.

SUMMARY

Systems and methods for obfuscating an optical signal are disclosed. Obfuscating the optical signal may make it more difficult for the optical signal to be detected by an interloper.

In one embodiment, there is provided a method that may include receiving an optical signal carrying data at an optical transmitter. The optical transmitter may perform a time-varying modification of the optical signal carrying the data to generate an obfuscated optical signal. The optical transmitter may transmit the obfuscated optical signal to an optical receiver. The optical receiver may perform a corresponding time-varying modification of the obfuscated optical signal to generate an at least partially deobfuscated optical signal carrying the data.

In another embodiment, there is provided an optical communication system. The optical communication system may include an optical transmitter having an optical signal modifier and a network output port. The optical signal modifier is for performing a time-varying modification of an optical signal carrying data to generate an obfuscated optical signal. The network output port is for transmitting the obfuscated optical signal. The optical communication system may also include an optical receiver having a network input port and a corresponding optical signal modifier. The network input port is for receiving the obfuscated optical signal, and the corresponding optical signal modifier is for performing a time-varying modification of the obfuscated optical signal to generate an at least partially deobfuscated optical signal carrying the data.

In another embodiment, there is provided a method performed at an optical transmitter. The method may include receiving an optical signal carrying data for transmission. The method may further include performing a time-varying modification of the optical signal carrying the data to generate an obfuscated optical signal. The method may further include transmitting the obfuscated optical signal.

In another embodiment, there is provided an optical transmitter. The optical transmitter may include an optical signal modifier for performing a time-varying modification of a received optical signal carrying data to generate an obfuscated optical signal. The optical transmitter may further include a network output port for transmitting the obfuscated optical signal.

In another embodiment, there is provided a method performed at an optical receiver. The method may include receiving an obfuscated optical signal carrying data. The method may further include performing a time-varying modification of the obfuscated optical signal to generate an at least partially deobfuscated optical signal carrying the data.

In another embodiment, there is provided an optical receiver. The optical receiver may include a network input port for receiving an obfuscated optical signal carrying data. The optical receiver may further include an optical signal modifier for performing a time-varying modification of the obfuscated optical signal to generate an at least partially deobfuscated optical signal carrying the data.

Other aspects and features will become apparent to those of ordinary skill in the art upon review of the following description.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Figure 1:
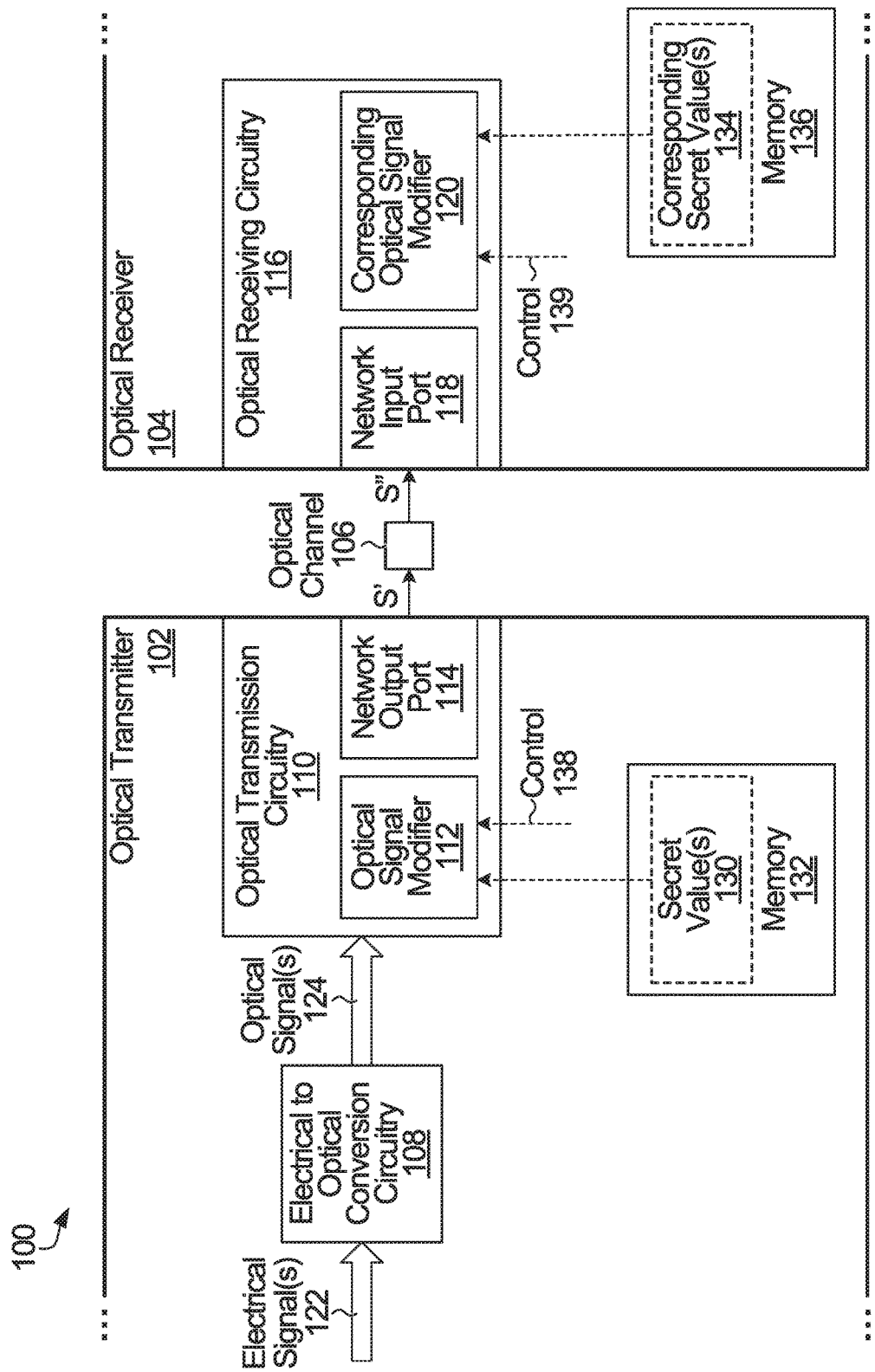
FIG. 1 is a block diagram of an optical communication system according to one embodiment.

FIG. 1 is a block diagram of an optical communication system 100 according to one embodiment. The system 100 includes an optical transmitter 102 connected to an optical receiver 104 through an optical channel 106. The optical channel 106 may be or include an optical fiber, an optical network, free space optical communication components, and/or other optical nodes or equipment. The optical transmitter 102 includes electrical-to-optical conversion circuitry 108 and optical transmission circuitry 110. The optical transmission circuitry 110 includes an optical signal modifier 112 and a network output port 114. The optical receiver 104 includes optical receiving circuitry 116. The optical receiving circuitry 116 includes a network input port 118 and another optical signal modifier 120 that corresponds to the optical signal modifier 112 at the optical transmitter 102. Optical signal modifier 120 will be referred to as the corresponding optical signal modifier 120.

The optical signal modifier 112 and corresponding optical signal modifier 120 are each circuitry that modifies an optical signal in the manner discussed herein. Example structures for the optical signal modifier 112 and corresponding optical signal modifier 120 include, but are not limited to: one or more delay elements (e.g. an electronically tunable silicon photonic delay line), one or more attenuation or amplification elements (e.g. a variable optical attenuator or an optical amplifier), one or more fiber spools (e.g. dispersive fibers and/or dispersion compensation fibers), and/or one or more tunable dispersion elements. The network output port 114 is a physical port, through which an optical signal may pass, that connects the optical transmitter 102 to the optical channel 106, so that an optical signal from the optical transmitter 102 can be transmitted into the optical channel 106. Similarly, the network output port 118 is a physical port, through which an optical signal may pass, that connects the optical receiver 104 to the optical channel 106, so that an optical signal from the optical channel 106 can be transmitted into the optical receiver 104.

In operation, one or more electrical signals 122 carrying data in the electrical domain are converted into one or more optical signals 124 carrying the data. At least one of the optical signals 124 carrying at least some of the data is modified by the optical signal modifier 112 to generate an obfuscated optical signal. The obfuscated optical signal is transmitted from the network output port 114 through the optical channel 106 and received at the network input port 118 of the optical receiver 104. The optical channel 106 may introduce noise into the obfuscated optical signal. Therefore, the obfuscated optical signal as transmitted from the network output port 114 is shown as signal S' in FIG. 1, and the obfuscated optical signal as received at the network input port 118 is shown as signal S". The corresponding optical signal modifier 120 modifies the received obfuscated optical signal S" to generate an at least partially deobfuscated optical signal carrying data. An optical signal that is at least partially deobfuscated is an optical signal in which at least some of the obfuscation introduced at the optical transmitter 102 by the optical signal modifier 112 is reversed or eliminated. Partial deobfuscation is performed so that the deobfuscated version of signal S" is within the range of the detection capabilities of the optical receiver 104. Full deobfuscation is not necessarily required, just enough to allow for detection of the transmitted data by the optical receiver 104. For example, the deobfuscation need only be sufficient to put the received optical signal into a range that can be recovered by digital signal processing at the optical receiver 104.

FIG. 1 is simplified for ease of explanation. The optical transmitter 102 and the optical receiver 104 may include other physical components used in transmitting and receiving optical signals. Also, in alternative embodiments, the optical signal modifier 112 may be separate from the optical transmission circuitry 110, and/or the corresponding optical signal modifier 120 may be separate from the optical receiving circuitry 116.

Optionally, one or more secret values 130 are stored in a memory 132 at the optical transmitter 102, and one or more corresponding secret values 134 are stored in a memory 136 at the optical receiver 104. The optical signal modifier 112 may modify an optical signal in accordance with the one or more secret values 130 to generate the obfuscated optical signal, and the corresponding optical signal modifier 120 may modify the obfuscated optical signal in accordance with the one or more corresponding secret values 134 to generate the at least partially deobfuscated optical signal.

When a value is referred to as being "secret", it is meant that the value is not intended to be publicly accessible, but is instead intended to be held in secret by only the party or parties authorized to know the value.

The one or more secret values 130 and 134, when used, may be provided and utilized in different ways. Some examples are as follows. The one or more secret values 130 may be sent by a trusted entity over a secure channel to the optical transmitter 102, and the one or more corresponding secret values 134 may be sent by the trusted entity over a secure channel to the optical receiver 104. A trusted entity could be any of a number of different entities, including a software defined networking (SND) controller, a transport SDN (T-SND) controller, other SDN and T-SDN entities, or another entity trusted by the optical transmitter 102 and the optical receiver 104, e.g. an operation, administration, and management (OA&M) entity. The one or more secret values 130 may be used to specify how the optical signal modifier 112 is to modify an optical signal, and the one or more corresponding secret values 134 may then be used to specify how the corresponding optical signal modifier 120 is to modify the obfuscated optical signal.

As another example, the one or more secret values 130 may be programmed into the optical transmitter 102 upon manufacture, and the one or more corresponding secret values 134 may be programmed into the optical receiver 104 upon manufacture. Alternatively, the one or more corresponding secret values 134 may be sent to the optical receiver 104 from the optical transmitter 102 over a secure channel, in which case the optical transmitter 102 may generate the one or more corresponding secret values 134 based on the one or more secret values 130, and in which case the one or more secret values 130 may be randomly generated at the optical transmitter 102, or the one or more secret values 130 may be programmed into the optical transmitter 102 upon manufacture, or the one or more secret values 130 may be sent by a trusted entity over a secure channel to the optical transmitter 102.

The optical signal modifier 112 may modify the optical signal in a time-varying manner, in which case the corresponding optical signal modifier 120 also modifies the obfuscated optical signal in a corresponding time-varying manner. In embodiments in which the one or more secret values 130 are used by the optical signal modifier 112, the one or more secret values 130 may consist of a plurality of secret values, with each secret value of the plurality of secret values being used during a respective period of time to control modification of the optical signal by the optical signal modifier 112. Then, at the optical receiver 104, the one or more corresponding secret values 134 may consist of a plurality of corresponding secret values, with each one of the plurality of corresponding secret values also being used during a corresponding respective period of time to control modification of the obfuscated optical signal by the optical signal modifier 120. The plurality of secret values used by the optical transmitter 102 and the optical receiver 104 may be sent by a trusted entity in one transmission, or sent one at a time over a duration of time.

As another example, a respective initial value and delta value may be stored in each of memory 132 and 136, and a secret sequence may be obtained by each of the optical transmitter 102 and the optical receiver 104. Each value in the sequence may indicate how the delta value is to be applied to change how the optical signal is modified by the optical signal modifier 112 and corresponding optical signal modifier 120. The sequence may be sent from a trusted entity or established between the optical transmitter 102 and the optical receiver 104 via a key agreement protocol. The sequence may be a cryptographically secure pseudorandom sequence or originate from a cryptographically secure pseudorandom sequence.

As another example, a respective initial value may be stored in each of memory 132 and 136, and a plurality of different secret delta values may generated by a trusted entity and sent to the optical transmitter 102 and the optical receiver 104 over a secure channel. The secret delta values may be generated using a cryptographically secure pseudorandom sequence. Each time the optical signal modifier 112 and the corresponding optical signal modifier 120 are to change the way the optical signal is to be modified, the next delta value from the plurality of secret different delta values is chosen and used to change how the optical signal is modified.

In embodiments in which the optical signal is modified in a time-varying manner, coordination between the optical transmitter 102 and the optical receiver 104 is used so that the optical transmitter 102 and the optical receiver 104 change the way in which they modify the signal in a synchronized manner. This coordination may be achieved in different ways. One way is to have a trusted entity send a control signal to the optical transmitter 102 and to the optical receiver 104 that indicates when the change is to occur. Another way is to have a synchronized counter at the optical transmitter 102 and the optical receiver 104, and when each counter reaches the same predetermined value, the change in how the optical signal is modified occurs at the optical transmitter 102 and the optical receiver 104. Another way is to have the optical transmitter 102 generate the control signal including an indication that the obfuscation parameters are changing. The control signal is then sent from the optical transmitter 102 to the optical receiver 104. The control signal may be generated using a counter and/or a clock such that the control signal indicates to change the way in which the optical signal is modified on a periodic basis. Alternatively, the control signal may be generated randomly or controlled by a cryptographically secure pseudorandom sequence. Arrow 138 and 139 are illustrated using stippled lines in FIG. 1 to indicate that control of how the optical signal is to be modified may be present in some embodiments.

Some specific examples of secret values and how they are used to modify an optical signal are discussed later when describing example implementations.

FIGS. 2A to 2H are block diagrams each respectively showing an example of the location of optical signal modifier 112 and corresponding optical signal modifier 120 in the communication chain.

Figure 2A:
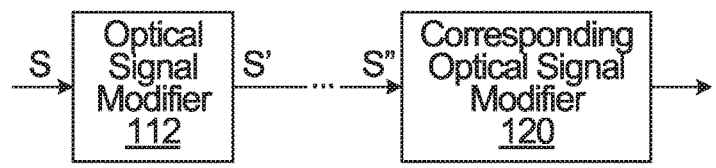
FIGS. 2A to 2H are block diagrams each respectively showing an example of the location of an optical signal modifier and corresponding optical signal modifier in a communication chain.

In FIG. 2A, an optical signal S is modified by the optical signal modifier 112 to generate obfuscated optical signal S', which is then transmitted over an optical channel (not shown). The received obfuscated optical signal S" is modified by the corresponding optical signal modifier 120 to generate an at least partially deobfuscated optical signal.

Figure 2B:
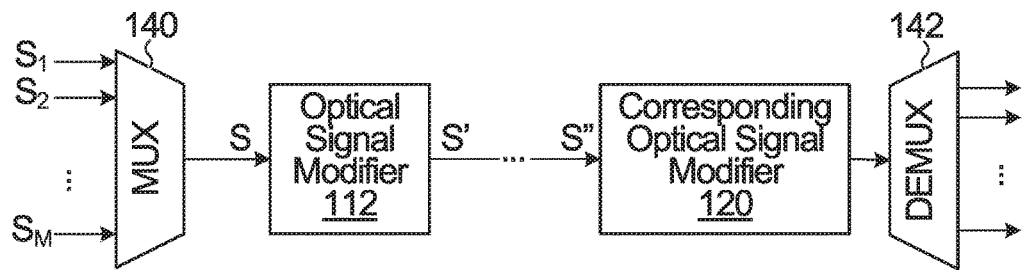

In FIG. 2B, a multiplexer 140 is illustrated on the transmit side, which forms part of the optical transmission circuitry 110 of FIG. 1. A demultiplexer 142 is illustrated on the receive side, which forms part of the optical receiving circuitry 116 of FIG. 1. In operation, a plurality of optical signals $S_1$ to $S_M$ are multiplexed by the multiplexer 140 to generate the optical signal S. The optical signal S is then modified by the optical signal modifier 112 to generate the obfuscated optical signal S', which is then transmitted over an optical channel. The received obfuscated optical signal S" is modified by the corresponding optical signal modifier 120 to generate an at least partially deobfuscated optical signal, which is then sent to the demultiplexer 142 to be demultiplexed into a plurality of optical signals.

Figure 2C:
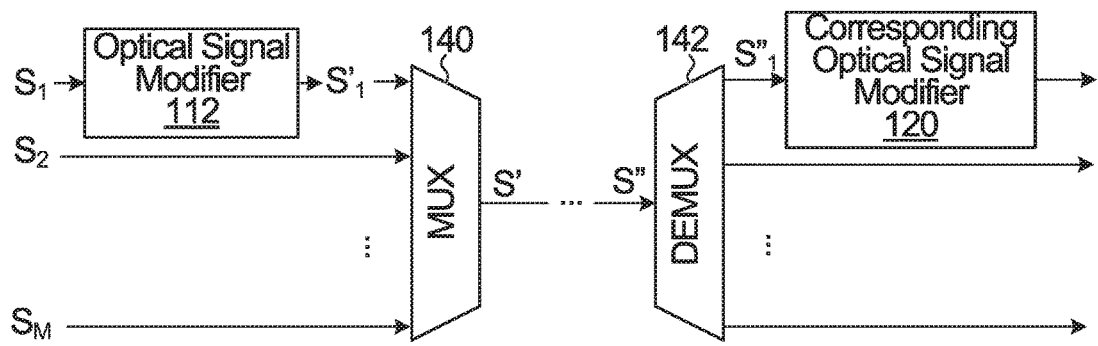

FIG. 2C is a variation of FIG. 2B in which the optical signal modifier 112 is instead placed before the multiplexer 140, and the corresponding optical signal modifier 120 is placed after the demultiplexer 142. In operation, an optical signal $S_1$ is modified by the optical signal modifier 112 to generate an obfuscated optical signal $S_1'$. The obfuscated optical signal S is then multiplexed with a plurality of other optical signals $S_2$ to $S_M$ to generate optical signal S', which is sent over the optical channel. The received optical signal S" is demuliplexed into a plurality of optical signals, one of which is obfuscated optical signal $S_1"$, which corresponds to transmitted obfuscated optical signal $S_1'$. The received obfuscated optical signal $S_1"$ is modified by the corresponding optical signal modifier 120 to generate an at least partially deobfuscated optical signal.

FIGS. 2D to 2H illustrate examples in which the optical signal S is a dual polarization signal having polarizations X and Y. When one polarization of the optical signal is modified at the transmitter to generate an obfuscated optical signal, then the received signal is at least partially doobfuscated by either modifying the same polarization at the receiver (e.g. as in FIG. 2H) or modifying the opposite polarization at the receiver (e.g. as in FIGS. 2D to 2G), depending upon the implementation. For example, as discussed in more detail later, in one implementation if a delay element is added to one polarization at the transmit side to obfuscate the optical signal, then a delay element is also added to the opposite polarization at the receive side to offset the relative delay between the two polarizations. In another implementation, if one polarization of the optical signal is attenuated at the transmit side to obfuscate the optical signal, then at the receive side the opposite polarization may be attenuated to offset the relative power difference between the two polarizations, or instead at the receive side the same polarization as was attenuated at the transmit side may be amplified at the receive side to reverse at least some of the attenuation applied at the transmit side. In another implementation, chromatic dispersion may be added to one polarization at the transmit side and the chromatic dispersion is compensated on the same polarization at the receive side.

Figure 2D:
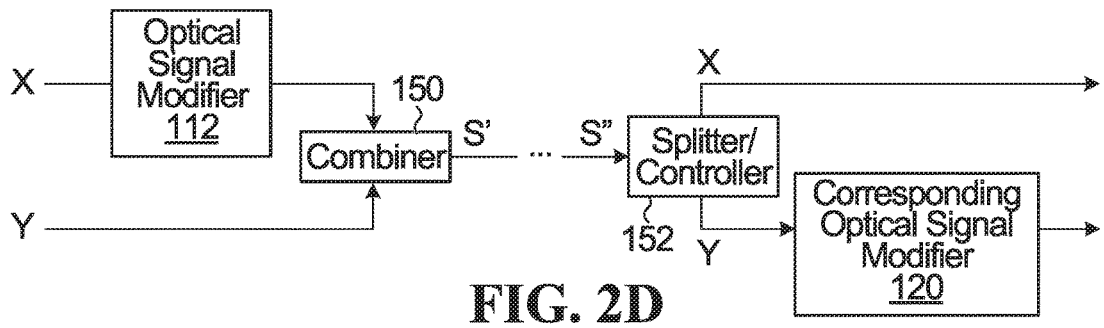

FIG. 2D illustrates the situation in which the X polarization is modified at the transmit side and a corresponding modification is performed on the Y polarization at the receive side. A combiner 150 is illustrated on the transmit side, which forms part of the optical transmission circuitry 110 of FIG. 1. A splitter/controller 152 is illustrated on the receive side, which forms part of the optical receiving circuitry 116 of FIG. 1. The splitter/controller 152 includes tracking functionality to track the state of polarization and extract the X and Y polarizations with sufficient power in each component. In operation, on the transmit side the optical signal modifier 112 modifies only the X polarization, which is then combined with the Y polarization via the combiner 150 to generate the obfuscated optical signal S'. The obfuscated optical signal S' is sent through the optical channel, and the received obfuscated optical signal S" is separated into X and Y polarizations via the splitter/controller 152. Then, only the Y polarization is sent to the corresponding optical signal modifier 120. The output of the corresponding optical signal modifier 120 and the received X polarization forms the at least partially doobfuscated optical signal. Although not illustrated, the output of the corresponding optical signal modifier 120 and the received X polarization may be combined again.

Figure 2E:
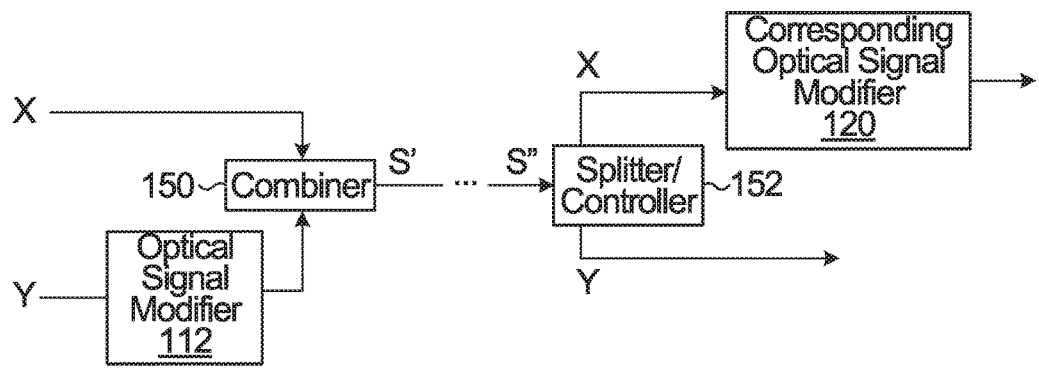

FIG. 2E is a variation of FIG. 2D. In FIG. 2E, the optical signal modifier 112 instead modifies only the Y polarization on the transmit side, and the corresponding optical signal modifier 120 instead modifies only the X polarization on the receive side.

In the embodiments illustrated in FIGS. 2D and 2E, the optical signal is a dual polarization signal, and the optical signal modifier 112 modifies one polarization (a "first" polarization), and the corresponding optical signal modifier 120 modifies the other polarization (a "second" polarization). In these embodiments, the optical signal modifier 112 modifies the first polarization to introduce a polarization dependent noise, loss, or dispersion between the two polarizations, and by doing so therefore obfuscates the optical signal. The corresponding optical signal modifier 120 then reverses or eliminates at least some of this polarization dependent noise, loss, or dispersion by modifying the second polarization in a corresponding way that is the same as or similar to the way in which the optical signal modifier 112 modified the first polarization.

The embodiments in FIGS. 2D and 2E operate on the principle that an optical receiver can only compensate for a certain amount of noise, loss, or dispersion that is present between the X and Y polarizations. If this amount of noise, loss, or dispersion is greater than that which can be compensated for by an optical receiver, then detection of the optical signal will likely fail. However, such polarization dependent noise, loss, or dispersion is relative. i.e., it is based on the difference between two polarization components. Therefore, this difference may be at least partially eliminated or reduced by performing the same or similar modification on each polarization.

By modifying the first polarization at the optical transmitter 102, the polarization dependent noise, loss, or dispersion is introduced, and in this way the optical signal is obfuscated. An interloper that intercepts the obfuscated optical signal would be unable to detect the optical signal, or at least potentially have a hard time doing so, since the polarization dependent noise, loss, or dispersion is greater than that which can be compensated for by the interloper's optical receiver. However, the optical receiver 104 intended to receive the obfuscated optical signal would know to modify the second polarization to reverse or eliminate at least some of the polarization dependent noise, loss, or dispersion, and thereby at least partially deobfuscate the obfuscated optical signal so that detection is possible.

For example, a delay may be introduced into the first polarization on the transmit side to create a polarization dependent noise or dispersion effect, and then the same delay may be introduced into the second polarization at the receive side to at least partially reverse this noise or dispersion effect. Specific example implementations are described later.

Figure 2F:
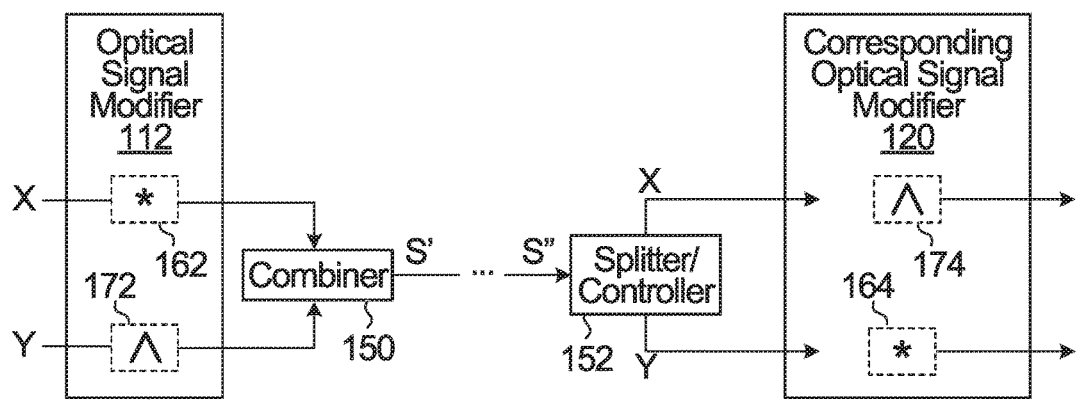

FIG. 2F illustrates more generally that the FIGS. 2D and 2E embodiments may be combined. In FIG. 2F, the optical signal modifier 112 modifies the X polarization, as shown at 162, and the same or similar modification is performed at the Y polarization by the corresponding optical signal modifier 120, as shown at 164. The asterisk character * is illustrated in boxes 162 and 164 to show that these modifications correspond to one another. Similarly, in FIG. 2F, the optical signal modifier 112 modifies the Y polarization, as shown at 172, and the same or similar modification is performed at the X polarization by the corresponding optical signal modifier 120, as shown at 174. The character Λ is illustrated in boxes 172 and 174 to show that these modifications correspond to one another. The boxes 162, 164, 172, and 174 are illustrated using stippled lines to indicate that these modifications are optional. These modifications may also vary in time. As an example, for a first period of time the optical signal modifier 112 may only modify the X polarization along with the corresponding optical signal modifier 120 only modifying the Y polarization. Then, during a second period of time, the optical signal modifier 112 may also modify the Y polarization along with the corresponding optical signal modifier 120 also modifying the X polarization. How the polarizations are modified may also vary in time.

Figure 2G:
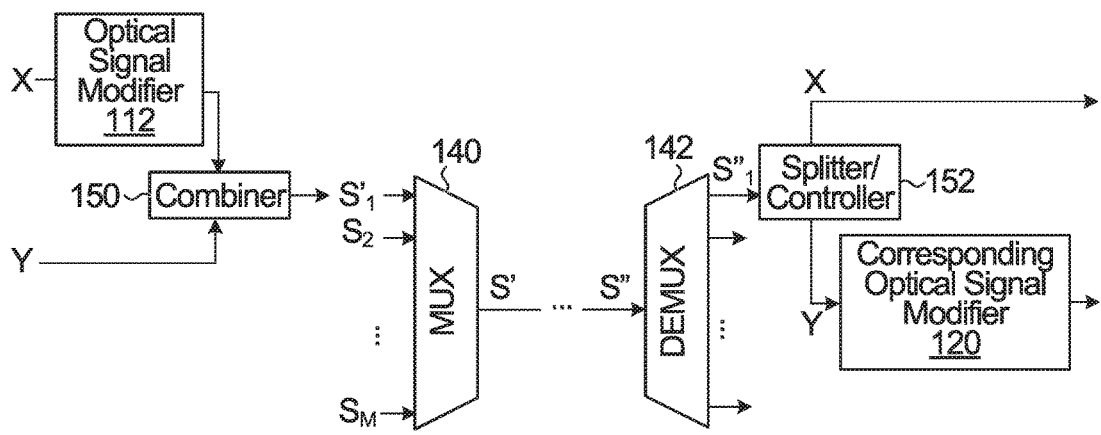

FIG. 2G is an example in which the embodiments of FIGS. 2C and 2D are combined. Optical signal $S_1$ is a dual polarization signal having polarizations X and Y. In operation, the optical signal modifier 112 modifies only the X polarization, which is then combined with the Y polarization via the combiner 150 to generate the obfuscated optical signal $S_1'$. The obfuscated optical signal $S_1'$ is then multiplexed with a plurality of other optical signals $S_2$ to $S_M$ to generate optical signal S', which is sent over the optical channel. The received optical signal S" is demultiplexed into a plurality of optical signals, one of which is obfuscated optical signal $S_1''$, which corresponds to transmitted obfuscated optical signal $S_1'$. The received obfuscated optical signal $S_1''$ is split into X and Y polarizations via the splitter/controller 152. Then, only the Y polarization is sent to the corresponding optical signal modifier 120. The output of the corresponding optical signal modifier 120 and the received X polarization forms the at least partially deobfuscated optical signal.

Figure 2H:
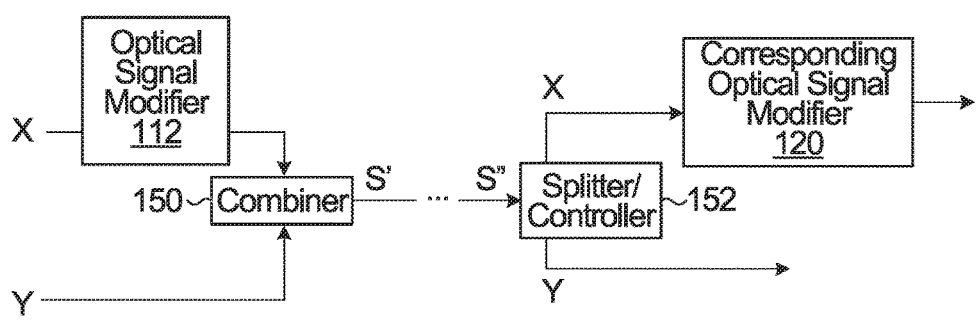

FIG. 2H illustrates the situation in which the X polarization is modified at the transmit side and a corresponding modification is also performed on the X polarization at the receive side. In operation, on the transmit side the optical signal modifier 112 modifies only the X polarization, which is then combined with the Y polarization via the combiner 150 to generate the obfuscated optical signal S'. The obfuscated optical signal S' is sent through the optical channel, and the received obfuscated optical signal S" is separated into X and Y polarizations via the splitter/controller 152. Then, only the X polarization is sent to the corresponding optical signal modifier 120. The output of the corresponding optical signal modifier 120 and the received Y polarization forms the at least partially deobfuscated optical signal. Although not illustrated, the output of the corresponding optical signal modifier 120 and the received Y polarization may be combined again. In another example, FIG. 2H may be modified to be the reverse: the Y polarization modified at the transmit side and a corresponding modification performed on the Y polarization at the receive side.

Although not illustrated, in each of FIGS. 2D to 2H a splitter may be present on the transmit side to split the optical signal into the X and Y polarizations before the optical signal modification, and a combiner may be present on the receive side to combine the X and Y polarizations after the corresponding optical signal modification.

Figure 3:
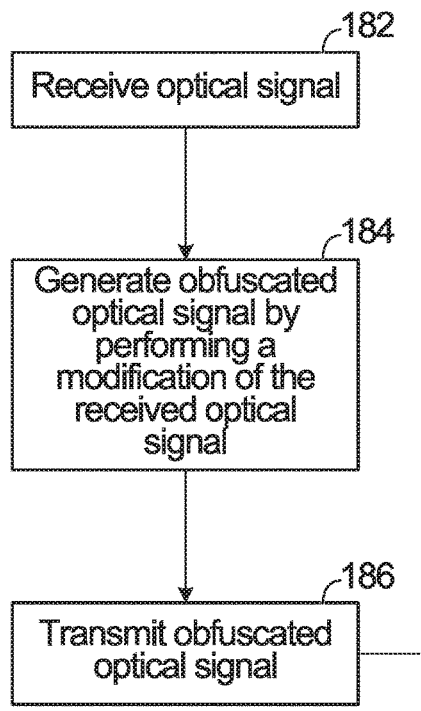
FIG. 3 is a flowchart of operations performed by an optical transmitter and an optical receiver according to one embodiment.
Figure 3:
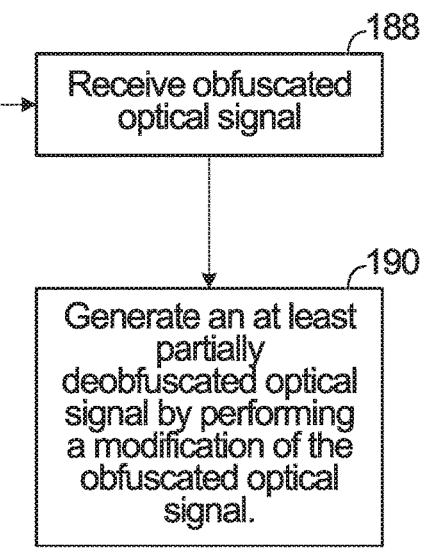

FIG. 3 is a flowchart of operations performed by the optical transmitter 102 and the optical receiver 104 according to one embodiment. In step 182 an optical signal carrying data is received at the optical transmitter 102. In step 184, an obfuscated optical signal is generated by performing a modification of the received optical signal. In step 186, the obfuscated optical signal is transmitted from the optical transmitter 102. In step 188, the obfuscated optical signal is received at the optical receiver 104. In step 190, an at least partially deobfuscated optical signal carrying the data is generated by performing a modification of the obfuscated optical signal. The modification in step 190 corresponds to that performed in step 184 to reverse or eliminate at least some of the obfuscation introduced because of the modification in step 184.

In some embodiments, the modification performed at steps 184 and 190 may be time-varying. In some embodiments, the modification performed at step 184 may be performed by modifying at least one of the following optical parameters of the optical signal received in step 182: an amplitude, a phase offset, a delay, a dispersion characteristic, a polarization, and a spectrum shape. A corresponding modification of the obfuscated optical signal is then performed at step 190.

Some more specific examples will now be described with reference to FIGS. 4 to 8.

Figure 4:
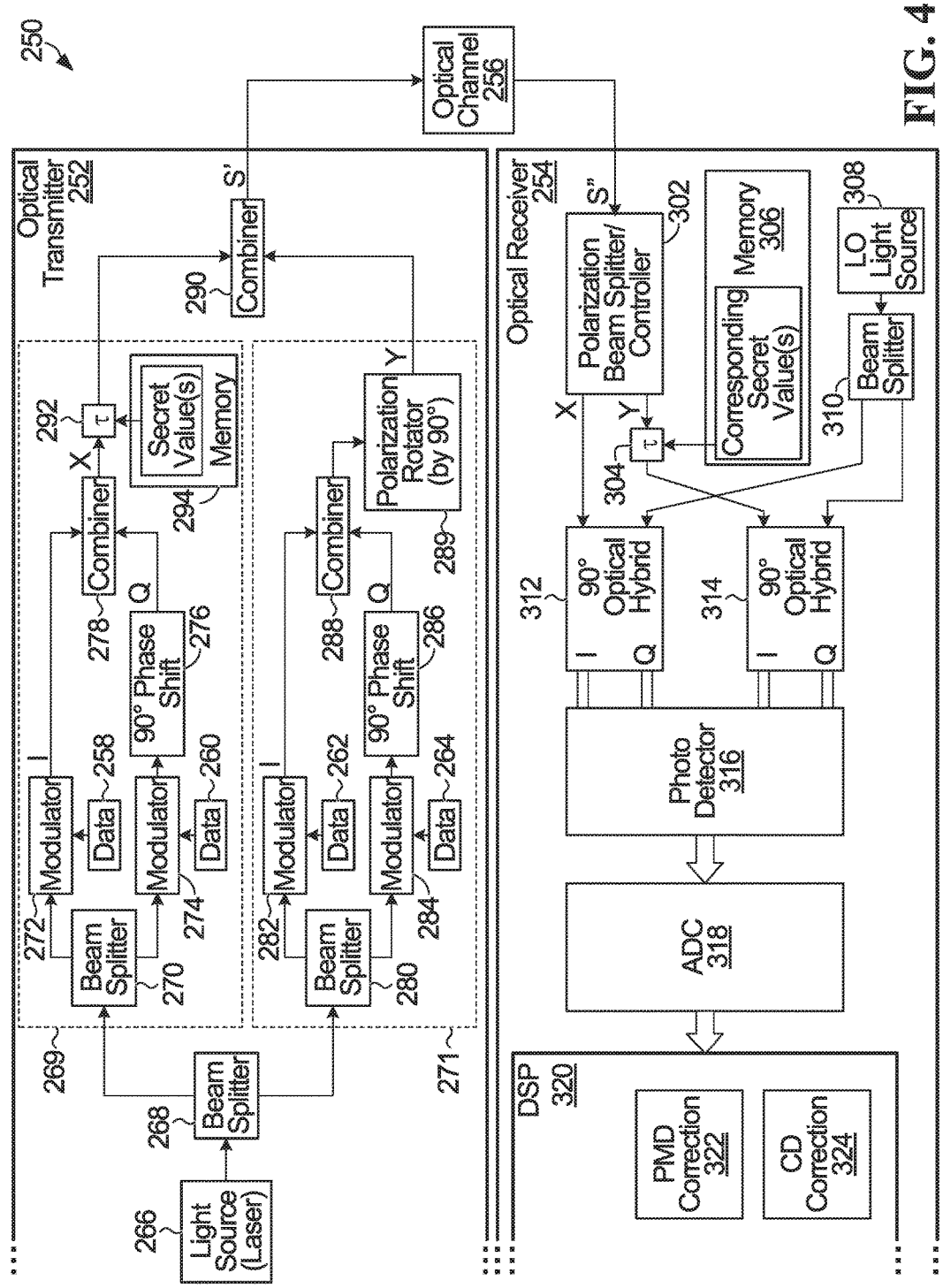
FIGS. 4 to 7 are each a block diagram of a respective optical communication system according to other embodiments.

FIG. 4 is a block diagram of an optical communication system 250 according to one embodiment. The system 250 includes an optical transmitter 252 and an optical receiver 254. The optical transmitter 252 and the optical receiver 254 are connected by an optical channel 256. The optical transmitter 252 is a coherent transmitter that transmits channels of digital data 258, 260, 262, and 264 via phase shift keying (PSK). The optical transmitter 252 includes a laser light source 266 coupled to a beam splitter 268, which splits the light into a first light beam destined for an upper branch 269 and into a second light beam destined for a lower branch 271. The upper branch includes a beam splitter 270, the output of which is coupled to two modulators 272 and 274. The output of modulator 272 is an in-phase (I) channel, and the output of modulator 274 is coupled to circuitry for performing a 90-degree phase shift, shown at 276, which creates a quadrature (Q) channel. The I and Q channel are coupled to a combiner 278, the output of which is the X polarization.

The lower branch also includes a beam splitter 280, the output of which is coupled to two modulators 282 and 284. The output of modulator 282 is an I channel, and the output of modulator 284 is coupled to circuitry for performing a 90-degree phase shift, shown at 286, which creates the Q channel. The I and Q channels are coupled to a combiner 288, the output of which is coupled to a polarization rotator 289, which rotates the polarization of the beam to create the Y polarization. A combiner 290 combines the X and Y polarizations.

Interposed between the combiner 278 in the upper branch 269 and the combiner 290 is a delay element 292, which adds a delay τ to the X polarization. An example way to implement the delay element 292 is to use an electronically tunable silicon photonic delay line, such as that disclosed in "Electronically tunable silicon photonic delay lines" by Saeed Khan et al., published in Optics Express Vol. 19. Issue 12. pp. 11780-11785, in June 2011. The delay τ is determined in accordance with at least one secret value stored in memory 294 at the optical transmitter 252.

The optical receiver 254 is a coherent receiver that detects and decodes the optical signal received from the optical channel 256. The optical receiver 254 includes a polarization beam splitter/controller 302 that tracks the state of polarization and separates the received optical signal into an X polarization and a Y polarization. A delay element 304 adds the delay τ to the Y polarization. The delay τ is determined in accordance with at least one corresponding secret value stored in memory 306 of the optical receiver 254. The optical receiver 254 further includes a local oscillator (LO) light source 308, the output of which is coupled to a beam splitter 310. A first 90-degree optical hybrid 312 receives as its input the X polarization signal from the polarization splitter/controller 302 and one output of the beam splitter 310, and the output of the first 90-degree optical hybrid 312 is coupled to a photo detector 316. A second 90-degree optical hybrid 314 receives as its input the output of the delay element 304 and the other output of the beam splitter 310, and the output of the second 90-degree optical hybrid 314 is also coupled to the photo detector 316. The output of the photo detector 316 is an electrical signal and is coupled to an analog-to-digital convertor (ADC) 318. The output of the ADC 318 is coupled to a digital signal processor (DSP) 320, which performs digital processing such as polarization mode dispersion (PMD) correction 322 and chromatic dispersion (CD) correction 324. The PMD correction 322 can only correct polarization mode dispersion within a certain level of tolerance, e.g. max 100 ps between the X and Y polarizations. If the polarization mode dispersion is too large, then it will not be corrected and detection of the digital data will not be possible or will be harder. Similarly, the CD correction 324 can only correct chromatic dispersion within a certain level of tolerance, and if the chromatic dispersion is too large, then it will not be corrected and detection of the digital data will not be possible or will be harder.

In operation, the laser light source 266 in the optical transmitter 252 produces a light beam that is split into two light beams by the beam splitter 268. One of the two light beams is sent to the upper branch 269 and is further split into two light beams by beam splitter 270. The digital data 258 is modulated via modulator 272 onto one output of the beam splitter 270 to create the I channel. The digital data 260 is modulated via modulator 274 onto the other output of the beam splitter 270, and the output of modulator 274 then undergoes a 90-degree phase shift to create the Q channel. The I and Q channels are then combined using the combiner 278 to create the X polarization. The X polarization is then delayed by the delay value τ. In the lower branch 271, the other output of the beam splitter 268 is further split into two light beams by beam splitter 280. The digital data 262 is modulated via modulator 272 onto one output of the beam splitter 280 to create the I channel. The digital data 264 is modulated via modulator 284 onto the other output of the beam splitter 280, and the output of modulator 284 then undergoes a 90-degree phase shift to create the Q channel. The I and Q channels are then combined using the combiner 288, and the polarization is rotated by 90-degrees, to create the Y polarization. The Y polarization is combined with the delayed X polarization using the combiner 290 to generate an optical signal S'. The optical signal S' is obfuscated because of the delay element 292 adding a delay τ to the X polarization. This delay creates an intentional polarization mode dispersion effect that renders the optical signal obfuscated and therefore more difficult or impossible to detect, unless the optical receiver knows to and knows how to modify the obfuscated optical signal S' to reverse or eliminate at least some of such intentional polarization mode dispersion and therefore at least partially deobfuscate the signal.

The obfuscated optical signal S' is sent through the optical channel 256, which introduces other unintentional noise, loss, or dispersion into the obfuscated optical signal S' to result in received obfuscated optical signal S". The polarization beam splitter/controller 302 of the optical receiver 254 splits the received obfuscated optical signal S" into X and Y polarizations, and the Y polarization is then delayed by the same delay value τ that was applied to the X polarization at the optical transmitter 252. This has the effect of at least partially deobfuscating the obfuscated optical signal S", as now the intentional delay has been added to both polarizations, which reduces or eliminates the polarization mode dispersion effect and makes it possible or easier to detect the signal. The 90-degree optical hybrids 312 and 314 work in conjunction with the photo detector 316 to process and convert the received X polarization and delayed Y polarization signals into the electrical domain. The electrical signal is then sampled using the ADC 318 and undergoes the DSP 320.

The obfuscated optical signal S' has an intentional polarization mode dispersion effect due to applying the delay value τ to only the X polarization and not the Y polarization in the optical transmitter 252. If the optical receiver 254 did not apply the delay value τ to the Y polarization to reverse or eliminate at least some of the polarization mode dispersion, then the polarization mode dispersion would be too large to be connected by the PMD correction 322 in the DSP 320, and therefore detection of the digital data would not be possible or would be harder. However, the optical receiver 254 does apply the delay value τ to the Y polarization to modify the obfuscated optical signal S" to reverse or eliminate at least some of the polarization mode dispersion prior to conversion of the optical signal into the electrical domain, and so the PMD correction 322 in the DSP 320 is successful. On the other hand, an interloper would not know to even apply a delay value τ to the Y polarization and/or would not know what particular delay value τ to apply. Therefore, any PMD correction in the interloper would not be able to correct the polarization mode dispersion thereby making detection of the obfuscated optical signal S" not possible or harder.

The delay value τ at the optical transmitter 252 is chosen in accordance with one or more secret values stored in the memory 294, and the same delay value τ at the optical receiver 254 is chosen in accordance with one or more corresponding secret values stored in memory 306. Some examples of how the secret values may be provided and how they may translate into delay value τ are listed below.

(1) A single secret value equal to the delay value τ may be sent by a trusted entity to the optical transmitter 252 and the optical receiver 254. Alternatively, the single secret value equal to the delay value τ may be programmed into each of the optical transmitter 252 and the optical receiver 254 upon manufacture. As another example, the single secret value equal to the delay value τ may be sent to the optical receiver 254 from the optical transmitter 252, in which case the optical transmitter 252 may randomly generate the single secret value, or the single secret value may be programmed into the optical transmitter 252 upon manufacture, or the single secret value may be sent by a trusted entity to the optical transmitter 252.

(2) The modification of the optical signal may be time-varying such that the delay value τ changes over time. In this case, a plurality of secret delay values $\tau_a, \tau_b, \ldots \tau_k$ may be sent by a trusted entity to the optical transmitter 252 and the optical receiver 254. The plurality of secret delay values $\tau_a, \tau_b, \ldots \tau_k$ may all be sent in one transmission or sent one at a time over a duration of time. Over time the delay value τ applied at the optical transmitter 252 and the optical receiver 254 changes from one value to the next, e.g., the delay $\tau_a$ is applied at the optical transmitter 252 and the optical receiver 254 for a first duration of time, then after the first duration of time is over, the delay m is applied at the optical transmitter 252 and the optical receiver 254 for a second duration of time, and so on. As another example, an initial delay value (e.g. 150 picoseconds) may be stored in memory 294 and 306, as well as a delta value (e.g. 35 picoseconds), and each value in a secret sequence may be used to indicate whether to increase the current delay τ by delta or decrease the current delay τ by delta. The sequence may be a pseudorandom sequence. The pseudorandom sequence may be cryptographically secure. As another example, an initial value (e.g. 150 picoseconds) may be stored in memory 294 and 306, and a plurality of different secret delta values may be generated by a trusted entity. e.g. using a pseudorandom sequence that may be cryptographically secure. The plurality of different secret delta values may be sent to the optical transmitter 252 and the optical receiver 254 from a trusted entity. Each instance in which the delay value is to be modified, the next delta value from the plurality of different secret delta values is chosen and used to modify the current delay value T.

FIG. 4 illustrates an example of the situation in FIG. 2D, as the delay value is added to the X polarization at the optical transmitter 252 and the delay value is added to the Y polarization at the optical receiver 254. The other examples shown in FIGS. 2A to 2G may also or instead be implemented in a similar manner using the delay value. Also, because the delay is being added to one polarization of the optical signal and not the other, this will change the phase offset between the two polarizations. Therefore, in this example it may also be said that the phase offset between the two polarizations of the optical signal is being manipulated to generate the obfuscated optical signal.

Figure 5:
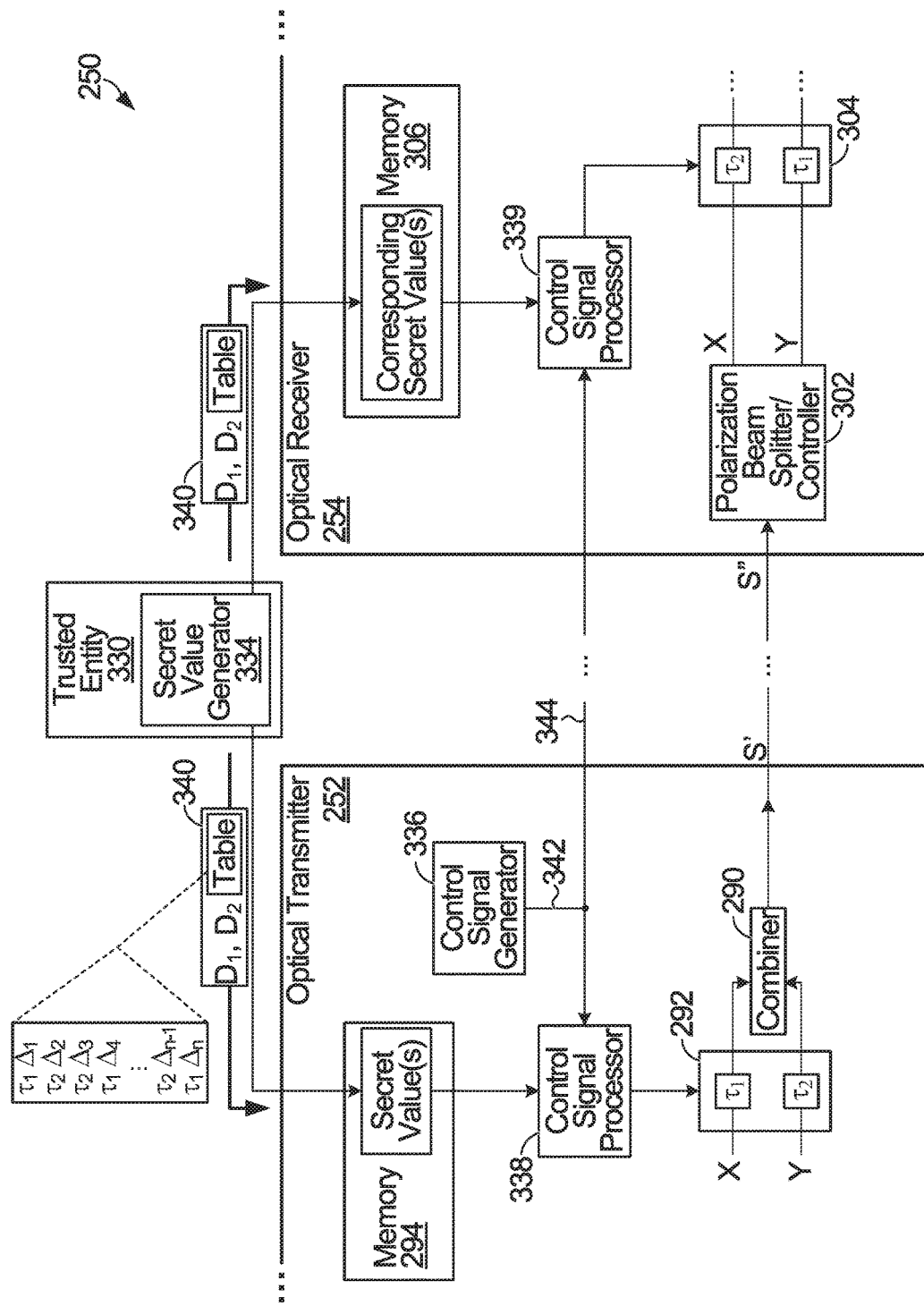

FIG. 5 is a block diagram of the optical communication system 250 according to an embodiment in which an optical signal is modified using delay values in a time-varying manner. The delay values are based on secret values provided by a trusted entity, and a control signal is used to determine when a new delay value is to be applied.

The optical communication system 250 additionally includes a trusted entity 330 that has a secret value generator 334. The optical transmitter 252 additionally includes a control signal generator 336 coupled to a control signal processor 338, and the optical receiver 254 additionally includes a corresponding control signal processor 339. The control signal processor 338 is interposed between the memory 294 and the delay element 292, and the corresponding control signal processor 339 is interposed between the memory 306 and the delay element 304.

The secret value generator 334 may be implemented using a processor that executes instructions that causes the processor to perform the operations of the secret value generator 334. Alternatively, the secret value generator 334 may be dedicated integrated circuity, such as an application specific integrated circuit (ASIC), a graphics processing unit (GPU), or a programmed field programmable gate array (FPGA) for performing one or more of the functions described herein. In some embodiments, the secret value generator 334 may be or include a pseudorandom number generator, which may be cryptographically secure. The control signal generator 336 and the control signal processor 338 in the optical transmitter 252 may each be implemented by a processor (that may be the same processor for both the control signal generator 336 and the control signal processor 338 or a different processor for each one) that executes instructions that causes the processor to perform the operations of the control signal generator 336 and the control signal processor 338. Alternatively, the control signal generator 336 and/or the control signal processor 338 may be implemented using dedicated integrated circuitry (e.g. an ASIC, GPU, or FPGA). In some embodiments, the control signal generator 336 may include, be, or implement a clock, a counter, or a pseudorandom number generator. The control signal processor 339 in the optical receiver 254 may be implemented by a processor that executes instructions that causes the processor to perform the operations of the control signal processor 339, or alternatively the control signal processor 339 may be implemented using dedicated integrated circuitry (e.g. an ASIC, GPU, or FPGA). In the FIG. 5 embodiment, the delay elements 292 and 304 instead each add a delay to the X and the Y polarization as follows: a delay value $\tau_1$ is added to the X polarization at the optical transmitter 252 and to the Y polarization at the optical receiver 254, and a delay value $\tau_2$ is added to the Y polarization at the optical transmitter 252 and to the X polarization at the optical receiver 254. The delay values $\tau_1$ and $\tau_2$ change over time, and delay value $\tau_1$ or delay value $\tau_2$ may sometimes be zero.

In operation, the secret value generator 334 in the trusted entity 330 generates initial delay values $D_1$ and $D_2$, as well as a set of secret delta values $\Delta_1, \Delta_2, \ldots, \Delta_n$. The trusted entity 334 then creates a table having n rows. A respective secret delta value is stored in each row, along with an indication as to whether the delta value in that row is to apply to delay value $\tau_1$ or to delay value $\tau_2$. The table and initial delay values $D_1$ and $D_2$ are then transmitted in a message 340 to the optical transmitter 252 and the optical receiver 254 over a secure channel. For example, the message 340 may be encrypted before being sent and then decrypted at the optical transmitter 252 and optical receiver 254. The delay element 292 of the optical transmitter 252 then sets $\tau_1=D_1$ and $\tau_2=D_2$ for a first duration of time, and for each subsequent duration of time modifies delay value $\tau_1$ or delay value $\tau_2$ according to a respective row in the table. The same action is performed by the delay element 304 in the optical receiver 254.

As an example, the initial delay values may be $D_1=150$ picosecond and $D_2=0$ picoseconds, the set of secret delta values may be $\Delta_1=+11$ picoseconds, $\Delta_2=+17$ picoseconds, $\Delta_3=-5$ picoseconds. $\Delta_4=-3$ picoseconds, $\ldots$, $\Delta_{n-1}=+7$ picoseconds, and $\Delta_n=-3$ picoseconds, and the table may be:

| | |
|---|---|
| $\tau_1$ | $\Delta_1 = +11$ |
| $\tau_2$ | $\Delta_2 = +17$ |
| $\tau_2$ | $\Delta_3 = -5$ |
| $\tau_1$ | $\Delta_4 = -3$ |
| ... | ... |
| $\tau_2$ | $\Delta_{n-1} = +7$ |
| $\tau_1$ | $\Delta_n = -3$ |

For a first duration of time, the delay element 292 of the optical transmitter 252 sets $\tau_1=D_1=150$ picosecond and $\tau_2=D_2=0$ picoseconds, and the delay element 304 of the optical receiver also sets $\tau_1=D_1=150$ picosecond and $\tau_2=D_2=0$ picoseconds. For a second duration of time, the delay element 292 of the optical transmitter 252 then changes delay value $\tau_1$ by $\Delta_1=+11$ picoseconds, as per the first row of the table: $\tau_1=150+11=161$ picoseconds. Delay element 304 of the optical receiver 254 does the same thing. Then, for a third duration of time, the delay element 292 of the optical transmitter 252 changes delay value $\tau_2$ by $\Delta_2=+17$ picoseconds, as per the second row of the table: $\tau_2=0+17=17$ picoseconds. Delay element 304 of the optical receiver 254 does the same thing. Then, for a fourth duration of time, the delay element 292 of the optical transmitter 252 changes delay value $\tau_2$ by $\Delta_3=-5$ picoseconds, as per the third row of the table: $\tau_1=17-5=12$ picoseconds. This continues, and by the end of all n rows, a new table is sent by the trusted entity 330 to be used next.

The initial delay values $D_1$ and $D_2$ and the set of delta values $\Delta_1, \Delta_2, \ldots, \Delta_n$ may be generated randomly by the trusted entity 330, such as by using a cryptographically secure pseudorandom sequence generator (not illustrated). Each of the delta values $\Delta_1, \Delta_2, \ldots, \Delta_n$ may be randomly associated with either $\tau_1$ or $\tau_2$ in the table. The rows of the table may also be randomly reordered. The trusted entity may use a pseudorandom sequence (which may be cryptographically secure) to apply a randomization or ordering to the table. However, in any case, in this embodiment, the initial delay values $D_1$ and $D_2$ and the set of delta values $\Delta_1, \Delta_2, \ldots, \Delta_n$ are generated in a way to ensure that each one of delay values $\tau_1$ and $\tau_2$ is always greater than or equal to zero, and delay values $\tau_1$ and $\tau_2$ never equal each other.

The control signal generator 336 in the optical transmitter 252 generates a control signal 342 that indicates when it is time to change the modification in delay elements 292 and 304, i.e. move to the next row in the table. The control signal 342 is sent to the control signal processor 338 in the optical transmitter 252, as well as over a control channel 344 to the corresponding control signal processor 339 in the optical receiver 254. The control signal processor 338 computes and updates delay element 292 based on the next row in the table stored in memory 294 when the control signal 342 indicates to do so. The corresponding control signal processor 339 in the optical receiver 339 does the same thing to also update delay element 304 in synchronization with the update to delay element 292.

The control signal 342 may be a pulse that may be sent over the control channel 344 using on-off keying (OOK). The pulse may be generated randomly by the control signal generator 336, such as by using a pseudorandom sequence, which may be cryptographically secure. Alternatively the pulse may be generated periodically according to a clock or counter. A possible benefit of having a control signal based on a cryptographically secure pseudorandom sequence is that it may add an additional level of security compared to using a control signal that can be easily observed and predicted. Security may then be two-fold: secret values to control the modification and secure randomization of the control signal to indicate when the modification is to change. That is, there may be both randomized variation of physical characteristics of the optical signal and randomized transitions in the control signal.

FIGS. 4 and 5 illustrate embodiments in which an optical signal is modified at an optical transmitter using at least one delay value added to one polarization to generate an obfuscated optical signal, and then the same at least one delay value is added to the other polarization at the optical receiver to at least partially deobfuscate the obfuscated optical signal. As discussed earlier, adding a delay to one polarization introduces a polarization mode dispersion effect. Alternatively, instead of using delay values, attenuation of an amplitude of a polarization may be used to create a polarization dependent loss effect and thereby obfuscate the optical signal. This may be referred to as manipulating the power characteristics of the optical signal, rather than the delay or phase characteristics. For example, the optical communication system 250 in FIG. 4 may be modified to replace delay element 292 with an attenuation element that attenuates the X polarization by amount A, and to replace delay element 304 with an attenuation element that attenuates the Y polarization by amount A. The value of A may be changed over time. This may be done by using a variable optical attenuator (VOA). Similarly, the example in FIG. 5 may be modified to use attenuation values $A_1$ and $A_2$ in place of delay values $\tau_1$ and $\tau_2$.

Figure 6:
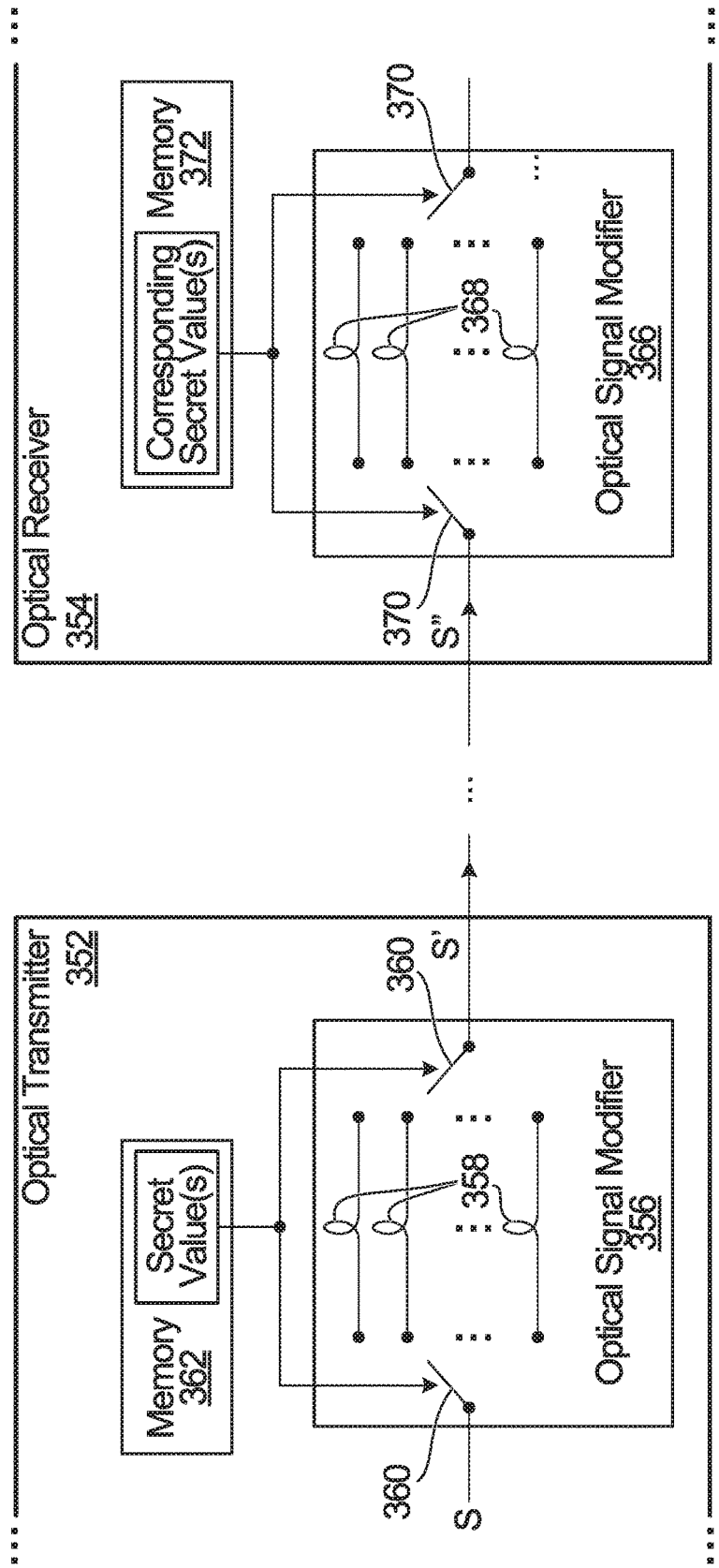

Alternatively, an attenuation element may be added to one polarization at the transmitter (e.g. replace delay element 292 in FIG. 4 with an attenuation element that attenuates the X polarization by amount A), and a corresponding amplifier may be added to the same polarization at the receiver (e.g. add an amplifier to amplifier by amount A the X polarization of the output of splitter/controller 302 in FIG. 4). The attenuator at the transmitter creates a polarization dependent loss effect and thereby obfuscates the optical signal, and the corresponding amplifier at the receiver amplifies the same polarization that was attenuated at the transmitter to try to eliminate or reverse at least some of the polarization dependent loss and thereby at least partially deobfuscate the received obfuscated optical signal. This would be an example of the situation in FIG. 2H. FIG. 6 is a block diagram of an optical communication system 350 according to another embodiment. The system 350 includes an optical transmitter 352 and an optical receiver 354. The optical transmitter 352 includes an optical signal modifier 356 that has a bank of dispersive fibers 358, each of which adds a respective predetermined amount of chromatic dispersion to an optical signal. The optical signal modifier 356 further has a switch 360, which controls which dispersive fiber the optical signal travels through. The switch 360 is controlled by one or more secret values stored in a memory 362. The optical receiver 354 includes a corresponding optical signal modifier 366 having a corresponding bank of dispersion compensation fibers 368, along with a corresponding switch 370, which controls which dispersion compensation fiber the received optical signal travels through. The corresponding switch 370 is controlled by one or more secret values stored in a memory 372.

In operation, an optical signal S passes through one of the dispersive fibers 358 to add chromatic dispersion and thereby generate an obfuscated optical signal S'. The obfuscated optical signal S' is transmitted through an optical channel (not shown) and received at the optical receiver 354 as received obfuscated optical signal S". The received obfuscated optical signal S" is sent through a corresponding one of the dispersion compensation fiber 368 in the optical receiver 354 to reverse or eliminate at least some of the chromatic dispersion introduced at the optical transmitter 352 and thereby generate an at least partially deobfuscated optical signal. The one or more secret values in memory 362 control selection of one of the dispersive fibers 358 at the optical transmitter 352, and the corresponding one or more secret values in memory 372 control selection of the corresponding dispersion compensation fibers 368 at the optical receiver 354.

The obfuscated optical signal S' has an intentional chromatic dispersion added at the optical transmitter 352. If the optical receiver 354 did not utilize optical signal modifier 366 to reverse or eliminate at least some of this chromatic dispersion, then the chromatic dispersion would be too large to be corrected by the standard chromatic dispersion correction applied in the digital signal processing (not shown) in the optical receiver 354. In this case, detection of the digital data would not be possible or would be harder. However, the optical receiver 354 does route the received obfuscated optical signal S" through the optical signal modifier 366 to reverse or eliminate at least some of the chromatic dispersion prior to conversion of the optical signal into the electrical domain, and so the chromatic dispersion correction in the digital signal processing in the optical receiver 354 is successful. On the other hand, an interloper would not know to even have circuitry in its optical receiver to reverse the chromatic dispersion, i.e., an interloper would not have optical signal modifier 366, and/or the interloper would not know by how much to reverse the chromatic dispersion. Therefore, any standard chromatic dispersion correction in the digital signal processing at the interloper would not be able to correct the additional chromatic dispersion thereby making detection of the obfuscated optical signal S" not possible or harder. A possible benefit of the FIG. 6 implementation compared to the FIG. 4 implementation is that in FIG. 6 the optical signal does not need to be split into X and Y polarizations. The FIG. 6 implementation does not depend upon having a dual polarization signal and may also work for a single polarization signal. The FIG. 6 implementation may be applied in both coherent and non-coherent systems, with high or low capacity optical signals, and with any modulation scheme. For example, the FIG. 6 implementation may work with intensity modulation direct detection (IM-DD) or dual polarization QPSK (DP-QPSK) or single polarization QPSK (SP-QPSK).

The provision and use of the secret values to control the switches 360 and 370 may be the same as described earlier in relation to the other embodiments. Also, the position of the switches 360 and 370 may be changed over time to provide a time-varying modification of the optical signal, in which case the coordination between the optical transmitter 352 and the optical receiver 354 may operate in the same way as described earlier in relation to the other embodiments.

Figure 7:
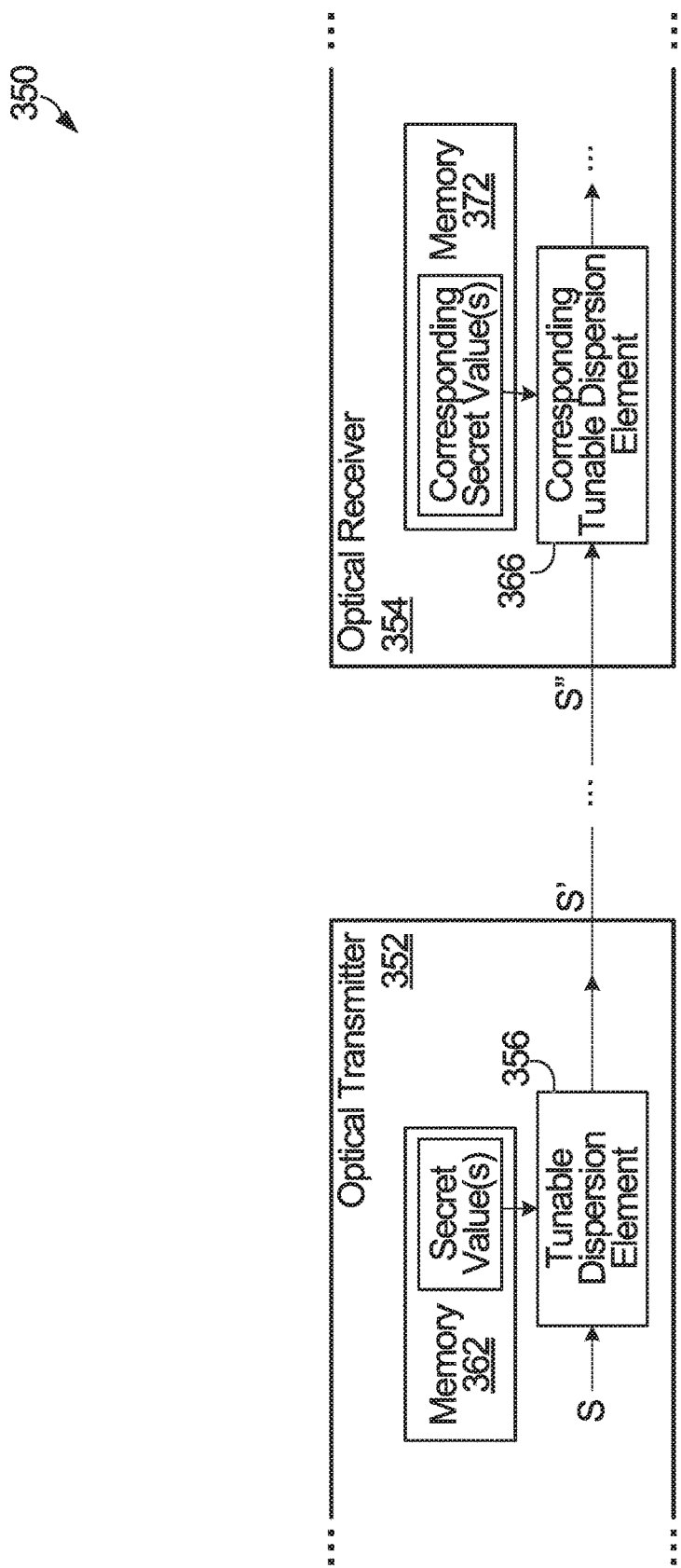

FIG. 7 is a block diagram of the optical communication system 350 according to an embodiment in which the optical signal modifiers 356 and 366 in FIG. 6 are instead each implemented by a respective tunable dispersion element, rather than a physical bank of fiber spools. Operation is the same as that described above in relation to FIG. 6, except that instead of having switches 360 and 370 selecting a respective physical fiber spool, the secret values stored in memory 362 control the amount of dispersion applied at the optical transmitter 352 using the tunable dispersion element 356, and the corresponding secret values stored in memory 372 control the amount of dispersion applied at the optical receiver 354 using the corresponding tunable dispersion element 366.

FIGS. 6 and 7 illustrate an example of the situation in FIG. 2A. However, the other examples shown in FIGS. 2B to 2H may also or instead be implemented in a similar manner, although typically if chromatic dispersion is only applied to one polarization at the transmit side then it is compensated in the same polarization at the receive side (e.g. as in FIG. 2H). Also, the dispersion in FIGS. 6 and 7 do not have to be chromatic dispersion. Other types of dispersion, such as modal dispersion and/or material dispersion, may be used instead. More generally, a dispersion characteristic of the optical signal may be modified. Modifying the amount of chromatic dispersion is one example of modifying a dispersion characteristic, and modifying the amount of chromatic dispersion is also an example of modifying an interference level of the optical signal.

Possible benefits of the example implementations described above are as follows. A level of security may be added at the fiber level. This level of security may be provided in addition to or instead of digital encryption in the electrical domain. Also, encryption in the electrical domain is applied to each digital data channel, whereas in some of the examples described above, several optical signals, each carrying one or more data channels, may be multiplexed into one optical signal that is then obfuscated in the manner described above. In this way, security may be applied to several data channels simultaneously. In data centers and other places in which large amounts of data are transported, it may be more economically attractive and/or more efficient to obfuscate a single optical signal representing many data channels. Further, an interloper may still try to use brute force to decrypt digital data. However, obfuscating the optical signal may prevent the interloper from even being able to detect the digital data, as signal retrieval itself becomes difficult or impossible for an interloper, in which case the interloper would not even have access to the encrypted digital data.

In the example implementations described above, a delay is added to create a polarization mode dispersion effect (e.g. FIGS. 4 and 5), or an amplitude is attenuated to create a polarization dependent loss effect (e.g. FIG. 5 modified to replace delay values $\tau_1$ and $\tau_2$ with attenuation values $A_1$ and $A_2$), or a dispersion characteristic is changed (e.g. chromatic dispersion, as in FIGS. 6 and 7). Other ways of modifying the optical signal are possible. Three more examples are as follows.

As a first example, and with respect to FIG. 1, the optical signal modifier 112 at the optical transmitter 102 may create one or more phase offsets between polarizations of an optical signal and thereby generate the obfuscated optical signal S'. This may be done by using a polarization splitter to split the optical signal into different polarizations and differentially modify the phases of the polarizations. Adding a delay element to one polarization of the optical signal. e.g. as in FIGS. 4 and 5, may achieve this, as delaying a signal affects its phase. However, more generally the phase of a polarization may be modified more directly in another way to result in the phase offset. The received obfuscated optical signal S" is then at least partially deobfuscated at the optical receiver 104 by having the corresponding optical signal modifier 120 reverse at least some of the polarization phase offset added by the optical signal modifier 112 at the optical transmitter 102. Alternately, after splitting the optical signal into two polarizations, each polarization can be subjected to a different delay. To compensate for this at the optical receiver 104, either the individual delays can be compensated for, or one of the two polarizations can be delayed by an amount similar to the differential in the delays.

Another example of a modification that can be applied to obfuscate the optical signal makes use of the splitting of polarizations. When a signal is split into two polarizations, the polarizations are typically orthogonal to each other (and have been referred to as X and Y polarizations). After a signal is split into orthogonal polarizations, one of the two polarizations can be rotated with respect to the other polarization at the optical transmitter 102. When recombined at the optical receiver 104, the polarizations will no longer be at 90 degrees to each other. So long as the optical receiver 104 is aware of the differential rotation of the polarizations, compensation can be applied during the polarization splitting via the corresponding optical signal modifier 120. Without compensation, the optical receiver 104 will see one of the polarizations as weaker than it should be, and there will be additional noise in the other polarization. Rotation of one of the polarizations with respect to the other can be modelled as a change in the principal axes of the received signal. The example is this paragraph is an example of modifying a polarization of the optical signal. As a third example, the optical signal modifier 112 at the optical transmitter 102 may modify a spectrum shape of an optical signal and thereby generate the obfuscated optical signal S'.

The received obfuscated optical signal S" is then at least partially deobfuscated at the optical receiver 104 by having the corresponding optical signal modifier 120 reverse at least some of the modified spectrum shape introduced by the optical signal modifier 112 at the optical transmitter 102. This may be achieved by implementing a spectrum masking function at the optical signal modifier 112 of the optical transmitter 102, and a corresponding spectrum masking function at the corresponding optical signal modifier 120 at the optical receiver 104. The corresponding spectrum masking function would have knowledge of the masking function applied at the optical transmitter 102 and would be configured to at least partially reverse or undue such masking.

In the embodiments described above, only one optical parameter of an optical signal is being modified, e.g.: the delay/phase, or the amplitude, or a dispersion characteristic, or a polarization, or a spectrum shape. Alternatively, different optical parameters may be modified at the same time (e.g. the delay/phase, amplitude, and a dispersion characteristic), which may add an extra layer of security. The optical parameters modified may change over time. Alternatively, only one optical parameter may be modified at a time, but the optical parameter modified may change over time. The optical parameters described above are all examples of analog characteristics of an optical signal.

Methods performed by an optical transmitter and/or an optical receiver are further described below. The optical transmitter may be optical transmitter 102 in FIG. 1, and the optical receiver may be optical receiver 104 in FIG. 1.

Figure 8:
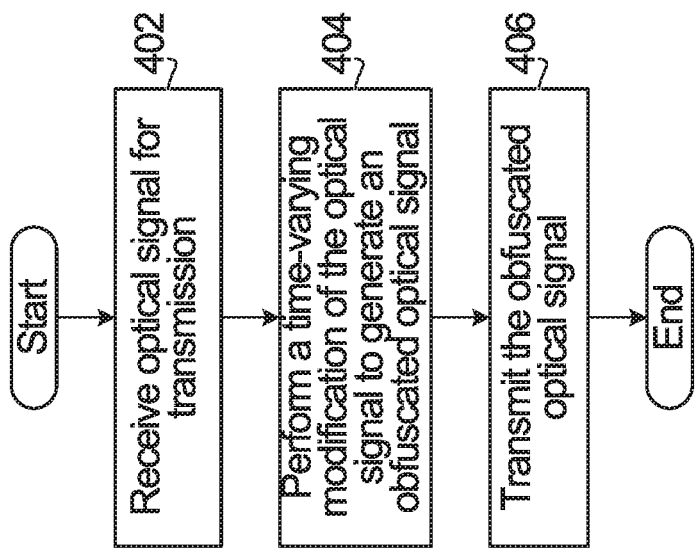
FIG. 8 is a flowchart of operations performed at an optical transmitter according to one embodiment.

FIG. 8 is a flowchart of operations performed at the optical transmitter according to one embodiment. In step 402, the optical transmitter receives an optical signal carrying data for transmission. In step 404, the optical transmitter performs a time-varying modification of the optical signal carrying the data to generate an obfuscated optical signal. In step 406, the optical transmitter transmits the obfuscated optical signal.

Figure 9:
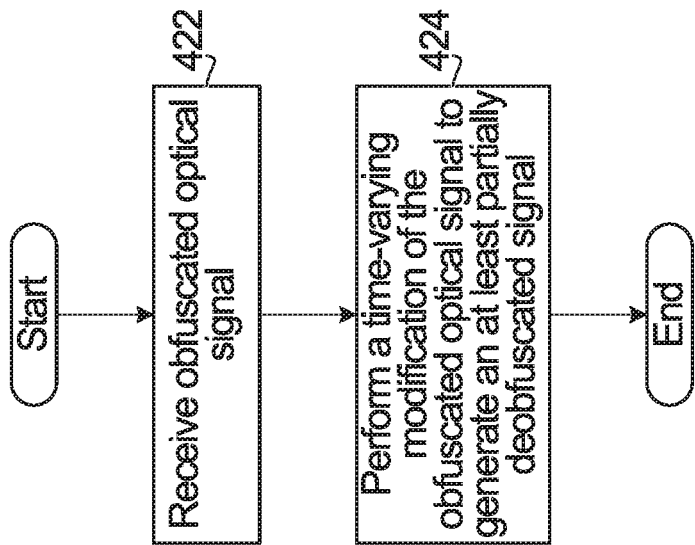
FIG. 9 is a flowchart of operations performed at an optical receiver according to one embodiment.

FIG. 9 is a flowchart of operations performed at the optical receiver according to one embodiment. In step 422, the optical receiver receives an obfuscated optical signal carrying data. In step 424, the optical receiver performs a time-varying modification of the obfuscated optical signal to generate an at least partially deobfuscated optical signal carrying the data.

Figure 10:
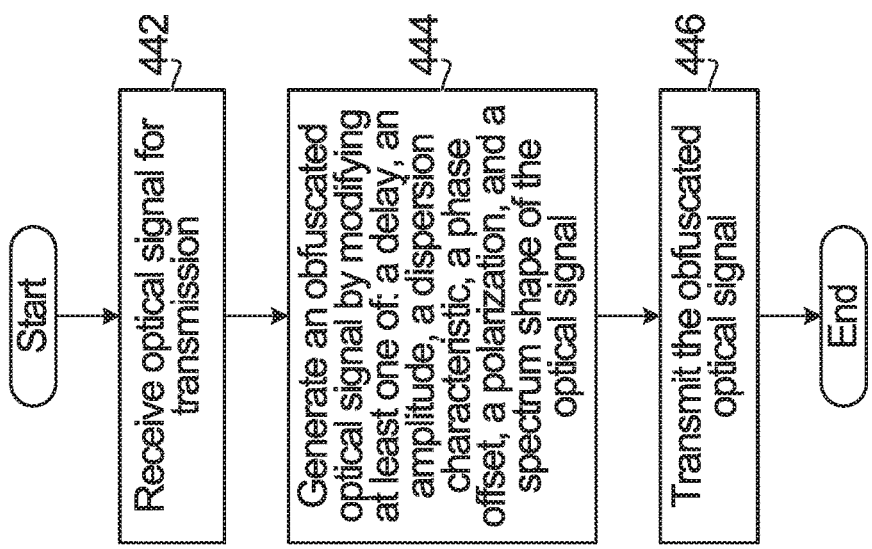
FIG. 10 is a flowchart of operations performed at an optical transmitter according to another embodiment.

FIG. 10 is a flowchart of operations performed at the optical transmitter according to another embodiment. In step 442, the optical transmitter receives an optical signal carrying data for transmission. In step 444, the optical transmitter generates an obfuscated optical signal carrying the data by modifying at least one of: a delay, an amplitude, a dispersion characteristic, a phase offset, a polarization, and a spectrum shape of the received optical signal. In step 446, the optical transmitter transmits the obfuscated optical signal.

Figure 11:
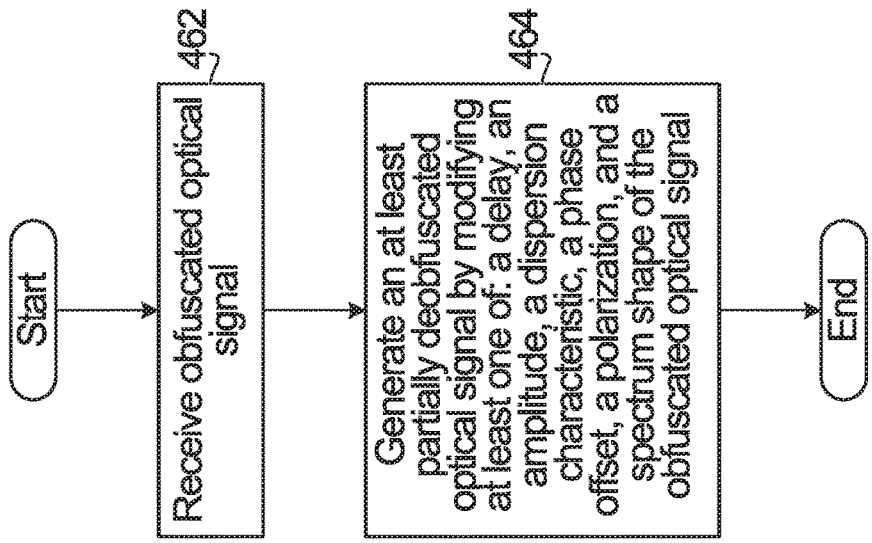
FIG. 11 is a flowchart of operations performed at an optical receiver according to another embodiment.

FIG. 11 is a flowchart of operations performed at the optical receiver according to one embodiment. In step 462, the optical receiver receives an obfuscated optical signal carrying data. In step 464, the optical receiver generates an at least partially deobfuscated optical signal carrying the data by modifying at least one of: a delay, an amplitude, a dispersion characteristic, a phase offset, a polarization, and a spectrum shape of the received obfuscated optical signal.

In some of the embodiments described above with respect to FIGS. 8 to 11, an optical parameter of the optical signal may be modified. The optical parameter may be a physical property, such as an analog characteristic of the optical signal. The optical parameter may be selected from the group consisting of: a delay, an amplitude, a dispersion characteristic, a phase offset, a polarization, and a spectrum shape of the optical signal. Modifying the optical signal may comprise modifying at least two optical parameters of the optical signal. Linear and/or non-linear optical signal processing may be performed to modify one or more optical parameters.

In some embodiments, the optical signal may be a dual polarization signal. In any case, when the optical signal has more than one polarization, then just one polarization of the optical signal may be modified. Alternatively, a first modification may be applied to a first polarization, and a second modification, different from the first modification, may be applied to a second polarization. When a modification is performed on the optical signal at the optical transmitter, a corresponding modification is performed on the obfuscated optical signal at the optical receiver to at least partially deobfuscate the obfuscated optical signal. The modification may be time-varying. Performing a time-varying modification of the optical signal at the optical transmitter may comprise modifying at least one of a delay, an amplitude, a dispersion characteristic, a phase offset, a polarization, and a spectrum shape of the optical signal. Then, performing the corresponding time-varying modification of the obfuscated optical signal at the optical receiver comprises providing a corresponding modification of the obfuscated optical signal, i.e., modifying at least one of a corresponding delay, a corresponding amplitude, a corresponding dispersion characteristic, a corresponding phase offset, a corresponding polarization, and a corresponding spectrum shape of the obfuscated optical signal.

In some embodiments, transmitting the obfuscated optical signal from the transmitter may comprise multiplexing the obfuscated optical signal with at least one other optical signal to generate a multiplexed optical signal, and then transmitting the multiplexed optical signal. Receiving the optical signal in the transmitter may comprise receiving the optical signal from a multiplexer. Receiving the obfuscated optical signal in the receiver may comprise receiving the obfuscated optical signal from an output of a demultiplexer. At the receiver, the at least partially deobfuscated optical signal may be transmitted to a demultiplexer and/or to another node.

The modification of the optical signal in the embodiments above is performed in the optical domain. That is, the modification occurs to the optical signal itself, after any modification to the data in the electrical domain. In some such embodiments, modifying the optical signal comprises degrading the optical signal by adding intentional degradation to the optical signal, such as by adding a noise, attenuation or dispersion effect.

A time-varying modification may be performed using a plurality of values, some or all of which may be secret. Each value at the transmitter may correspond to a respective value used at the receiver to eliminate at least some of the obfuscation. Performing a time-varying modification at the transmitter may comprise modifying the optical signal in accordance with a first value for a first time duration and modifying the optical signal in accordance with a second value for a second time duration. The second time duration may occur after the first time duration has elapsed. Modifying the optical signal in accordance with the first value may comprise introducing a first delay into a first polarization of the optical signal, the first delay determined by the first value, and modifying the optical signal in accordance with the second value may comprise introducing a second delay into the first polarization or a second polarization of the optical signal, the second delay determined by the second value.

In some embodiments, the method at the optical transmitter may comprise generating the optical signal by multiplexing a plurality of other optical signals, each of different wavelengths. Each one of the other optical signals may be a dual polarization signal. The generated optical signal may then be modified to generate an obfuscated optical signal.

In some embodiments, the optical signal at the transmitter may be split into a first signal having a first polarization and a second signal having a second polarization. Modifying the optical signal may then comprises modifying the first signal in accordance with a first value to obtain a modified first signal, and combining the modified first signal with the second signal to generate the obfuscated optical signal. In some embodiments, the method at the transmitter may comprise: for each of a plurality of time durations, obtaining a respective value for that time duration and modifying the optical signal in accordance with the respective value to generate the obfuscated optical signal. A control signal may be generated that indicates a length of each of the time durations. In some embodiments, at the receiver, a time-varying modification may be performed that comprises: modifying the obfuscated optical signal in accordance with a first value for a first duration of time. Then, after the first duration of time has elapsed, for a second duration of time: modifying the obfuscated optical signal in accordance with a second value. A control signal may be received at the receiver indicating that the first duration of time has elapsed. In some embodiments, at the receiver the obfuscated optical signal may be split into a first polarization and a second polarization. Modifying the obfuscated optical signal in accordance with the first value may comprise introducing a first delay into the first polarization of the obfuscated optical signal, the first delay determined by the first value. Modifying the obfuscated optical signal in accordance with the second value may comprise introducing a second delay into the first polarization or the second polarization of the optical signal, the second delay determined by the second value. In some embodiments, a received optical signal at the receiver may be demultiplexed into a plurality of signals each of different wavelengths, one of the plurality of signals being the obfuscated optical signal. In some embodiments, the obfuscated optical signal may be split into a first signal having a first polarization and a second signal having a second polarization. Modifying the obfuscated optical signal may comprise modifying the first signal. Detection may then be performed at the receiver using the first signal, as modified, and the second signal.

In some embodiments, the optical transmitter uses a secret value to generate the obfuscated optical signal. The secret value corresponds to a respective secret value stored at the receiver for use by the receiver to generate the at least partially deobfuscated optical signal. For example, a first polarization of the optical signal may be modified in accordance with a secret value, and this secret value corresponds to a respective secret value stored at the receiver for use by the receiver to modify the second polarization of the optical signal to generate the at least partially deobfuscated optical signal. Generating the at least partially deobfuscated optical signal may comprise reversing some degradation that may have been added to the optical signal at the transmitter using the secret value. From the perspective of the receiver, the secret value used at the receiver to at least partially deobfuscate an obfuscated optical signal corresponds to a respective secret value used at the transmitter to cause the obfuscation.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed at an optical transmitter comprising:
    receiving an optical signal carrying data for transmission;
    performing a time-varying modification of the optical signal carrying the data to generate an obfuscated optical signal; and
    transmitting the obfuscated optical signal;
    wherein the time-varying modification is performed in accordance with a plurality of values corresponding to a respective plurality of values for use in at least partially deobfuscating the obfuscated optical signal to allow for detection of the data carried by the received optical signal; and
    wherein the optical signal has a first polarization and a second polarization, and wherein performing the time-varying modification of the optical signal comprises applying a first time-varying modification to the first polarization, and when applying the first time-varying modification to the first polarization, either: applying no modification to the second polarization or applying a second modification, different from the first time-varying modification, to the second polarization.

2. The method of claim 1, wherein performing the time-varying modification of the optical signal comprises modifying an optical parameter of the optical signal.

3. The method of claim 2, wherein the optical parameter is an analog characteristic of the optical signal.

4. The method of claim 2, wherein the optical parameter is selected from the group consisting of: a delay, an amplitude, a dispersion characteristic, a phase offset, a polarization, and a spectrum shape of the optical signal.

5. The method of claim 1, wherein transmitting the obfuscated optical signal comprises multiplexing the obfuscated optical signal with at least one other optical signal to generate a multiplexed optical signal, and transmitting the multiplexed optical signal.

6. The method of claim 1, wherein receiving the optical signal comprises receiving the optical signal from a multiplexer.

7. An optical transmitter comprising:
    an optical signal modifier for performing a time-varying modification of a received optical signal carrying data to generate an obfuscated optical signal; and
    a network output port for transmitting the obfuscated optical signal;
    wherein the time-varying modification is performed in accordance with a plurality of values corresponding to a respective plurality of values for use in at least partially deobfuscating the obfuscated optical signal to allow for detection of the data carried by the received optical signal; and
    wherein the received optical signal has a first polarization and a second polarization, and wherein the optical signal modifier is configured to perform the time-varying modification by: applying a first time-varying modification to the first polarization, and when applying the first time-varying modification to the first polarization, either: applying no modification to the second polarization or applying a second modification, different from the first time-varying modification, to the second polarization.

8. The optical transmitter of claim 7, wherein the optical signal modifier is configured to perform the time-varying modification of the received optical signal by modifying an optical parameter selected from the group consisting of: a delay, an amplitude, a dispersion characteristic, a phase offset, a polarization, and a spectrum shape of the received optical signal.

9. The optical transmitter of claim 7, wherein the optical transmitter further comprises a multiplexer for multiplexing the obfuscated optical signal with at least one other optical signal to generate a multiplexed optical signal, and the network output port is configured to transmit the obfuscated optical signal by transmitting the multiplexed optical signal.

10. A method performed at an optical receiver comprising:
- receiving an obfuscated optical signal carrying data; and
- performing a time-varying modification of the obfuscated optical signal to generate an at least partially deobfuscated optical signal carrying the data to allow for detection of the data;
- wherein the time-varying modification is performed in accordance with a plurality of values corresponding to a respective plurality of values for use in generating the obfuscated optical signal; and
- wherein the obfuscated optical signal has a first polarization and a second polarization, and wherein performing the time-varying modification of the obfuscated optical signal comprises applying a first time-varying modification to the first polarization, and when applying the first time-varying modification to the first polarization, either: applying no modification to the second polarization or applying a second modification, different from the first time-varying modification, to the second polarization.

11. The method of claim 10, wherein performing the time-varying modification of the obfuscated optical signal comprises modifying an optical parameter of the obfuscated optical signal.

12. The method of claim 11, wherein the optical parameter is an analog characteristic of the obfuscated optical signal.

13. The method of claim 11, wherein the optical parameter is selected from the group consisting of: a delay, an amplitude, a dispersion characteristic, a phase offset, a polarization, and a spectrum shape of the obfuscated optical signal.

14. The method of claim 10, wherein receiving the obfuscated optical signal comprises receiving the obfuscated optical signal from an output of a demultiplexer.

15. The method of claim 10, further comprising transmitting the at least partially deobfuscated optical signal to a demultiplexer.

16. An optical receiver comprising:
- a network input port for receiving an obfuscated optical signal carrying data; and
- an optical signal modifier for performing a time-varying modification of the obfuscated optical signal to generate an at least partially deobfuscated optical signal carrying the data to allow for detection of the data;
- wherein the time-varying modification is performed in accordance with a plurality of values corresponding to a respective plurality of values for use in generating the obfuscated optical signal; and
- wherein the obfuscated optical signal has a first polarization and a second polarization, and wherein the optical signal modifier is configured to perform the time-varying modification by: applying a first time-varying modification to the first polarization, and when applying the first time-varying modification to the first polarization, either: applying no modification to the second polarization or applying a second modification, different from the first time-varying modification, to the second polarization.

17. The optical receiver of claim 16, wherein the optical signal modifier is configured to perform the time-varying modification of the obfuscated optical signal by modifying an optical parameter selected from the group consisting of: a delay, an amplitude, a dispersion characteristic, a phase offset, a polarization, and a spectrum shape of the obfuscated optical signal.

18. The optical receiver of claim 16, further comprising a demultiplexer for separating the obfuscated optical signal from a received optical signal.

19. A method comprising:
- receiving an optical signal carrying data at an optical transmitter;
- performing a time-varying modification of the optical signal carrying the data at the optical transmitter to generate an obfuscated optical signal;
- transmitting the obfuscated optical signal to an optical receiver;
- receiving the obfuscated optical signal at the optical receiver; and
- performing a corresponding time-varying modification of the obfuscated optical signal at the optical receiver to generate an at least partially deobfuscated optical signal carrying the data to allow for detection of the data;
- wherein the time-varying modification of the optical signal is performed in accordance with a plurality of values corresponding to a respective plurality of values used for performing the corresponding time-varying modification of the obfuscated optical signal; and
- wherein the optical signal has a first polarization and a second polarization, and wherein performing the time-varying modification of the optical signal comprises applying a first time-varying modification to the first polarization, and when applying the first time-varying modification to the first polarization, either: applying no modification to the second polarization or applying a second modification, different from the first time-varying modification, to the second polarization.

20. The method of claim 19, wherein:
- performing the time-varying modification of the optical signal at the optical transmitter comprises modifying at least one of: a delay, an amplitude, a dispersion characteristic, a phase offset, a polarization, and a spectrum shape of the optical signal; and
- performing the corresponding time-varying modification of the obfuscated optical signal at the optical receiver comprises modifying at least one of: a corresponding delay, a corresponding amplitude, a corresponding dispersion characteristic, a corresponding phase offset, a corresponding polarization, and a corresponding spectrum shape of the obfuscated optical signal.

21. An optical communication system comprising:
- an optical transmitter having: an optical signal modifier for performing a time-varying modification of an optical signal carrying data to generate an obfuscated optical signal, and a network output port for transmitting the obfuscated optical signal;
- an optical receiver having: a network input port for receiving the obfuscated optical signal, and a corresponding optical signal modifier for performing a corresponding time-varying modification of the obfuscated optical signal to generate an at least partially deobfuscated optical signal carrying the data to allow for detection of the data;
- wherein the time-varying modification of the optical signal is performed in accordance with a plurality of values corresponding to a respective plurality of values used for performing the corresponding time-varying modification of the obfuscated optical signal; and
- wherein the optical signal has a first polarization and a second polarization, and wherein the optical signal modifier is configured to perform the time-varying modification of the optical signal by: applying a first time-varying modification to the first polarization, and when applying the first time-varying modification to the first polarization, either: applying no modification to the second polarization or applying a second modification, different from the first time-varying modification, to the second polarization.

22. The optical communication system of claim 21 wherein:

the optical signal modifier is configured to perform the time-varying modification of the optical signal by modifying at least one of: a delay, an amplitude, a dispersion characteristic, a phase offset, a polarization, and a spectrum shape of the optical signal; and the corresponding optical signal modifier is configured to perform the time-varying modification of the obfuscated optical signal by modifying at least one of: a corresponding delay, a corresponding amplitude, a corresponding dispersion characteristic, a corresponding phase offset, a corresponding polarization, and a corresponding spectrum shape of the obfuscated optical signal.

23. The method of claim 1, wherein over time each value of the plurality of values controls how the optical signal is modified to generate the obfuscated optical signal.

24. The optical transmitter of claim 7, wherein over time each value of the plurality of values controls how the optical signal is modified to generate the obfuscated optical signal.

25. The method of claim 10, wherein over time each value of the plurality of values controls how the obfuscated optical signal is modified to generate the at least partially deobfuscated optical signal.

26. The optical receiver of claim 16, wherein over time each value of the plurality of values controls how the obfuscated optical signal is modified to generate the at least partially deobfuscated optical signal.

27. The method of claim 19, wherein over time each value of the plurality of values controls how the optical signal is modified to generate the obfuscated optical signal.

28. The optical communication system of claim 21, wherein over time each value of the plurality of values controls how the optical signal is modified to generate the obfuscated optical signal.

* * * * *